(12) United States Patent
Hu et al.

(10) Patent No.: US 10,990,804 B2
(45) Date of Patent: Apr. 27, 2021

(54) FACE IMAGE PROCESSING METHOD AND DEVICE, AND STORAGE MEDIUM

(71) Applicant: Tencent Technology (Shenzhen) Company Limited, Shenzhen (CN)

(72) Inventors: Kai Hu, Shenzhen (CN); Xiaoqi Li, Shenzhen (CN); Yue Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/008,417

(22) Filed: Aug. 31, 2020

(65) Prior Publication Data

US 2020/0401790 A1 Dec. 24, 2020

Related U.S. Application Data

(63) Continuation of application No. PCT/CN2019/092235, filed on Jun. 21, 2019.

(30) Foreign Application Priority Data

Jul. 25, 2018 (CN) .......................... 201810827850.7

(51) Int. Cl.
*G06K 9/00* (2006.01)

(52) U.S. Cl.
CPC ..... *G06K 9/00248* (2013.01); *G06K 9/00255* (2013.01); *G06K 9/00281* (2013.01)

(58) Field of Classification Search
CPC ........... G06K 9/00248; G06K 9/00255; G06K 9/00281
See application file for complete search history.

(56) References Cited

U.S. PATENT DOCUMENTS

2017/0069065 A1 3/2017 Lin
2020/0043213 A1* 2/2020 Bao ...................... G06T 11/001
(Continued)

FOREIGN PATENT DOCUMENTS

| CN | 107578382 A | 1/2018 |
| CN | 107730449 A | 2/2018 |
| CN | 109087239 A | 12/2018 |

OTHER PUBLICATIONS

Tencent Technology, WO, PCT/CN2019/092235, dated Sep. 23, 2019, 4 pgs.

(Continued)

*Primary Examiner* — Md K Talukder
(74) *Attorney, Agent, or Firm* — Morgan, Lewis & Bockius LLP

(57) ABSTRACT

Embodiments of this application disclose a face image processing method and apparatus, and a storage medium. The method includes: obtaining a to-be-processed face image; receiving an operation instruction for deforming a target face portion of a face in the face image, and determining an operation type of deformation according to the operation instruction; determining deformation parameters of the deformation according to the operation type, and generating an adjuster according to the deformation parameters; obtaining an adjustment amplitude by which the adjuster performs dynamic adjustment on the target face portion, and displaying a change effect of the target face portion based on the dynamic adjustment in a display interface; and determining an adjustment parameter according to the adjustment amplitude, and obtaining the deformed face image according to the adjustment parameter.

20 Claims, 11 Drawing Sheets

(56) References Cited

U.S. PATENT DOCUMENTS

| | | | |
|---|---|---|---|
| 2020/0097767 A1* | 3/2020 | Perry | G06K 9/00288 |
| 2020/0234482 A1* | 7/2020 | Krokhalev | G06K 9/00261 |
| 2020/0327641 A1* | 10/2020 | Xu | G06F 3/013 |
| 2020/0334812 A1* | 10/2020 | Su | G06K 9/00288 |
| 2020/0372692 A1* | 11/2020 | Ge | G06T 11/00 |
| 2020/0401790 A1* | 12/2020 | Hu | G06K 9/00281 |
| 2021/0035362 A1* | 2/2021 | Hao | G06T 19/20 |
| 2021/0049350 A1* | 2/2021 | Wu | G06K 9/00268 |

OTHER PUBLICATIONS

Tencent Technology, IPRP, PCT/CN2019/092235, dated Jan. 26, 2021, 5 pgs.

Tencent Technology, ISR, PCT/CN2019/092235, dated Sep. 23, 2019, 2 pgs.

* cited by examiner

FACE IMAGE PROCESSING METHOD AND DEVICE, AND STORAGE MEDIUM

CROSS REFERENCE TO RELATED APPLICATIONS

This application is a continuation application of PCT Patent Application No. PCT/CN2019/092235, entitled "FACE IMAGE PROCESSING METHOD AND DEVICE, AND STORAGE MEDIUM" filed on Jun. 21, 2019, which claims priority to Chinese Patent Application No. 201810827850.7, entitled "FACE IMAGE PROCESSING METHOD AND APPARATUS, AND STORAGE MEDIUM" filed on Jul. 25, 2018, all of which are incorporated by reference in their entirety.

FIELD OF THE TECHNOLOGY

This application relates to the field of image processing technologies, and specifically, to a face image processing method and apparatus, and a storage medium.

BACKGROUND OF THE DISCLOSURE

With the popularity of terminals such as digital cameras, tablet computers, and mobile phones, photographing has become a common action in users' daily life, and beautifying a face in an image has become a requirement of most beauty lovers. Shaping facial features is the most important step. For example, a deformation operation such as zooming in, zooming out, lengthening, or shortening may be performed to a certain extent on facial feature regions such as a face, eyes, a nose, a mouth, and eyebrows in a photographed images, to make the facial features look more delicate and good-looking.

In some face image processing technologies, when shaping the face in the image, a user needs to process a face position that the user intends to modify by means of manual clicking, moving, dragging or the like. Face-lift is used as an example. After selecting an image, the user first selects to enter a face lifting module, then selects a certain pushing granularity corresponding to the face lifting module, and then manually pushes a certain region at a position of the face. After releasing, the user performs the deformation operation on the region according to a relationship between a pushed distance and a selected granularity. The user may repeatedly perform different deformation pushing operations on this region.

SUMMARY

Embodiments of this application provide a face image processing method and apparatus, and a storage medium, so as to improve the convenience of processing a face image, and improve the processing effect of the face image.

The embodiments of this application provide the following solutions:

A face image processing method is performed by a computing device having a processor and memory storing a plurality of computer programs to be executed by the processor, the method including:

obtaining a to-be-processed face image;

receiving an operation instruction for deforming a target face portion of a face in the face image;

determining an operation type of deformation according to the operation instruction and deformation parameters of the deformation according to the operation type;

generating an adjuster according to the deformation parameters;

obtaining an adjustment amplitude by which the adjuster performs dynamic adjustment on the target face portion; and dynamically displaying a change effect of the target face portion based on the dynamic adjustment in a display interface.

A computing device, comprising a processor and a memory, the memory storing a plurality of computer programs, and the computer programs, when executed by the processor, causing the computing device to perform the aforementioned face image processing method:

A non-transitory computer-readable storage medium is provided, the storage medium storing a plurality of computer programs, the computer programs, when executed by a processor of a computing device, causing the computing device to perform the operations of any face image processing method according to the embodiments of this application.

BRIEF DESCRIPTION OF THE DRAWINGS

To describe the technical solutions in the embodiments of this application more clearly, the following briefly describes the accompanying drawings required for describing the embodiments. The accompanying drawings in the following description are merely some embodiments of this application, and a person skilled in the art may still derive other drawings from these accompanying drawings without creative efforts.

DESCRIPTION OF EMBODIMENTS

Figure 1:
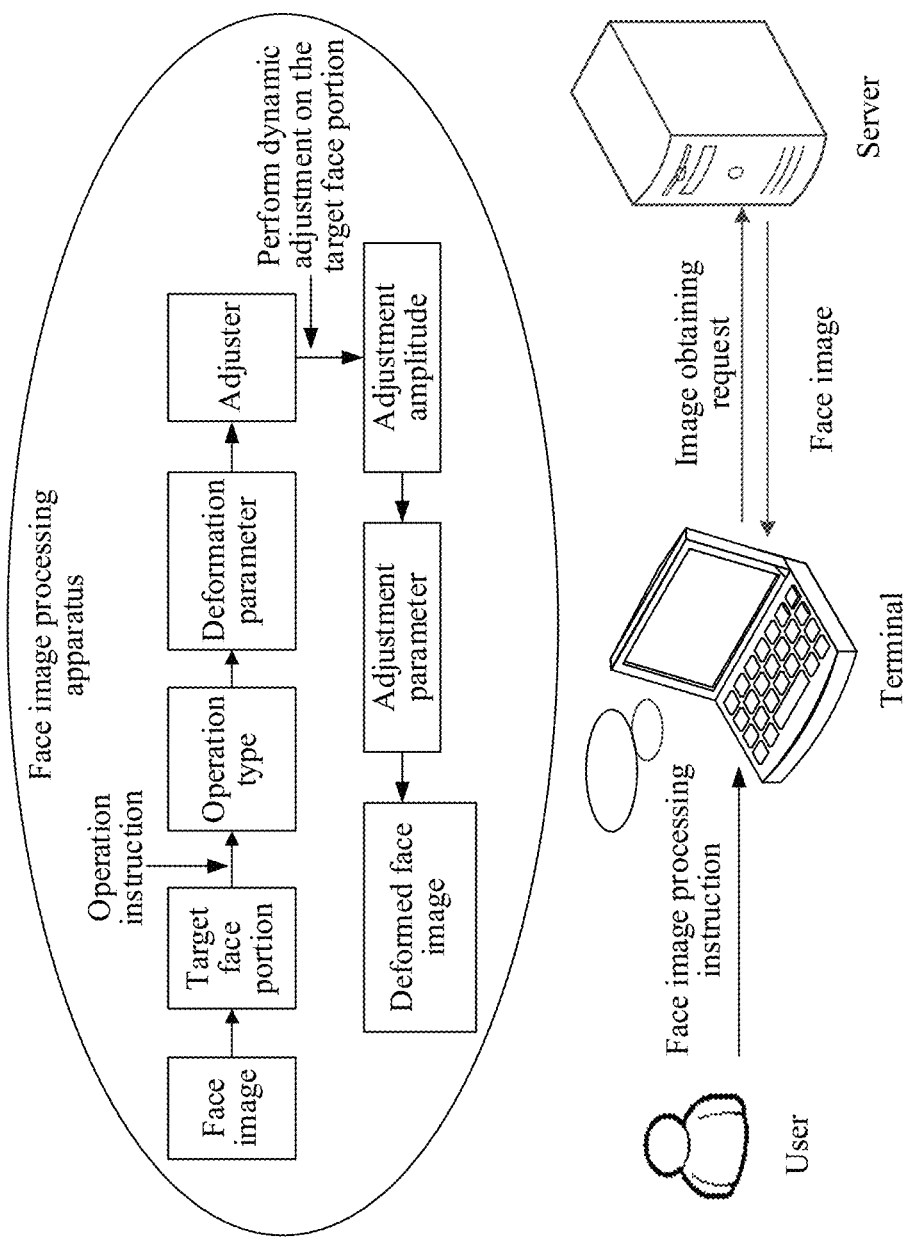
FIG. 1 is a schematic diagram of a scenario of a face image processing system according to an embodiment of this application.

The following clearly and completely describes the technical solutions in the embodiments of this application with reference to the accompanying drawings in the embodiments of this application. Apparently, the described embodiments are merely some of the embodiments of this application rather than all of the embodiments. All other embodiments obtained by a person skilled in the art based on the embodiments of this application without creative efforts shall fall within the protection scope of this application.

Inventors of this application find that, in some conventional face image processing technologies, if intending to perform deformation reshaping on a face, a user may need to manually control a deformed region, and process the face for a plurality of times to different degrees. In the process, because it is difficult to control a force, a region, and the like of a manual dragging operation, a deformed effect may be often unsatisfactory, and even a misoperation occurs. In addition, in the process, because the user needs to perform the manual operation for a plurality of times, steps are relatively complicated, which may be relatively time-consuming and power-consuming.

The embodiments of this application provide a face image processing method and apparatus, and a storage medium. A to-be-processed face image may be obtained, and an operation instruction for deforming a target face portion of a face in the face image may be received. An operation type of deformation is determined according to the operation instruction. For example, a deformation operation may be performed on a mouth width, an eye size, or a face size. Then, deformation parameters of the deformation are determined according to the operation type, and an adjuster is generated according to the deformation parameters. In this case, an adjustment amplitude by which the adjuster performs dynamic adjustment on the target face portion may be obtained, and a change effect of the target face portion based on the dynamic adjustment is displayed in a display interface, for user's reference to perform the dynamic adjustment. Finally, an adjustment parameter may be determined according to the adjustment amplitude, and a deformed face image is obtained according to the adjustment parameter. According to the face image processing solutions provided in the embodiments of this application, a to-be-deformed target face portion may be determined according to division of the face portions, the adjuster is generated according to the deformation parameters to perform dynamic adjustment on the target face portion, and the change effect of the target face portion based on the dynamic adjustment is displayed for the user's reference, so that the deformed face image can be obtained without manually performing a blind pushing operation by the user in the face region, thereby improving the convenience and the accuracy of processing the face image, improving the processing effect of the face image, and saving the processing time and the power.

FIG. 1 is a schematic diagram of a scenario of a face image processing system according to an embodiment of this application. The face image processing system may include a face image processing apparatus. The face image processing apparatus may be specifically integrated into a terminal, such as a tablet computer, a mobile phone, and a notebook computer, or a camera that has a storage unit and has a computing capability due to an installed microprocessor. For example, the terminal may obtain a to-be-processed face image. For example, when receiving a face image processing instruction inputted by a user, the terminal may obtain a face image from a local terminal, or transmit an image obtaining request to a server, and receive a face image returned by the server based on the image obtaining request. The local terminal includes the terminal itself or a device connected to the terminal. After obtaining the face image, the terminal may detect whether an operation instruction is received. When receiving an operation instruction for deforming a target face portion of a face in the face image, the terminal may determine an operation type of deformation according to the operation instruction. For example, the terminal may perform feature point detection on the face in the face image, to obtain feature points of face portions, determine a to-be-deformed face portion in the face image according to the feature points, to obtain a target face portion, generate a deformation operation interface according to a received deformation request, receive, through a portion selection interface in the deformation operation interface, an operation instruction for deforming the target face portion of the face in the face image, and select the operation type of the deformation through a type setting interface in the deformation operation interface according to the operation instruction. Then, the terminal may determine deformation parameters of the deformation according to the operation type, and generate an adjuster according to the deformation parameters. For example, the terminal may obtain a deformation unit set corresponding to the operation type, determine deformation parameters corresponding to each deformation unit in the deformation unit set, and generate the adjuster according to the deformation parameters. The deformation parameters may include a deformation center, a deformation radius, a deformation type, a deformation intensity, and the like. Next, the terminal obtains an adjustment amplitude by which the adjuster performs dynamic adjustment on the target face portion, and displays a change effect of the target face portion based on the dynamic adjustment in a display interface for user's reference. Finally, the terminal may determine an adjustment parameter according to the adjustment amplitude, and obtain the deformed face image according to the adjustment parameter. For example, the terminal may perform grid division on the face image, determine a grid region in which the target face portion is located, to obtain a target grid region, perform, according to the adjustment parameter, a deformation operation on the target grid region included in each deformation unit, to obtain a deformed grid region, construct a deformed face portion according to the deformed grid region, and obtain the deformed face image according to the deformed face portion.

The schematic diagram of the scenario of the face image processing system shown in FIG. 1 is merely an example. The face image processing system and the scenario described in this embodiment of this application are intended to more clearly describe the technical solutions of the embodiments of this application, and do not constitute a limitation to the technical solutions provided in the embodiments of this application. Along with evolution of the face image processing system and emergence of a new service scenario, the technical solutions provided in the embodiments of this application is also applicable to similar technical problems.

Detailed descriptions are separately provided below.

In an embodiment of this application, descriptions are made from the perspective of a face image processing apparatus. The face image processing apparatus may be specifically integrated into a terminal, such as a tablet computer, a mobile phone, and a notebook computer, or a camera that has a storage unit and has a computing capability due to an installed microprocessor.

A face image processing method performed by the face image processing apparatus includes: obtaining a to-be-processed face image; receiving an operation instruction for deforming a target face portion of a face in the face image, and determining an operation type of deformation according to the operation instruction; determining deformation parameters of the deformation according to the operation type, and generating an adjuster according to the deformation parameters; obtaining an adjustment amplitude by which the adjuster performs dynamic adjustment on the target face portion, and displaying a change effect of the target face portion based on the dynamic adjustment in a display interface; and determining an adjustment parameter according to the adjustment amplitude, and obtaining the deformed face image according to the adjustment parameter.

Figure 2:
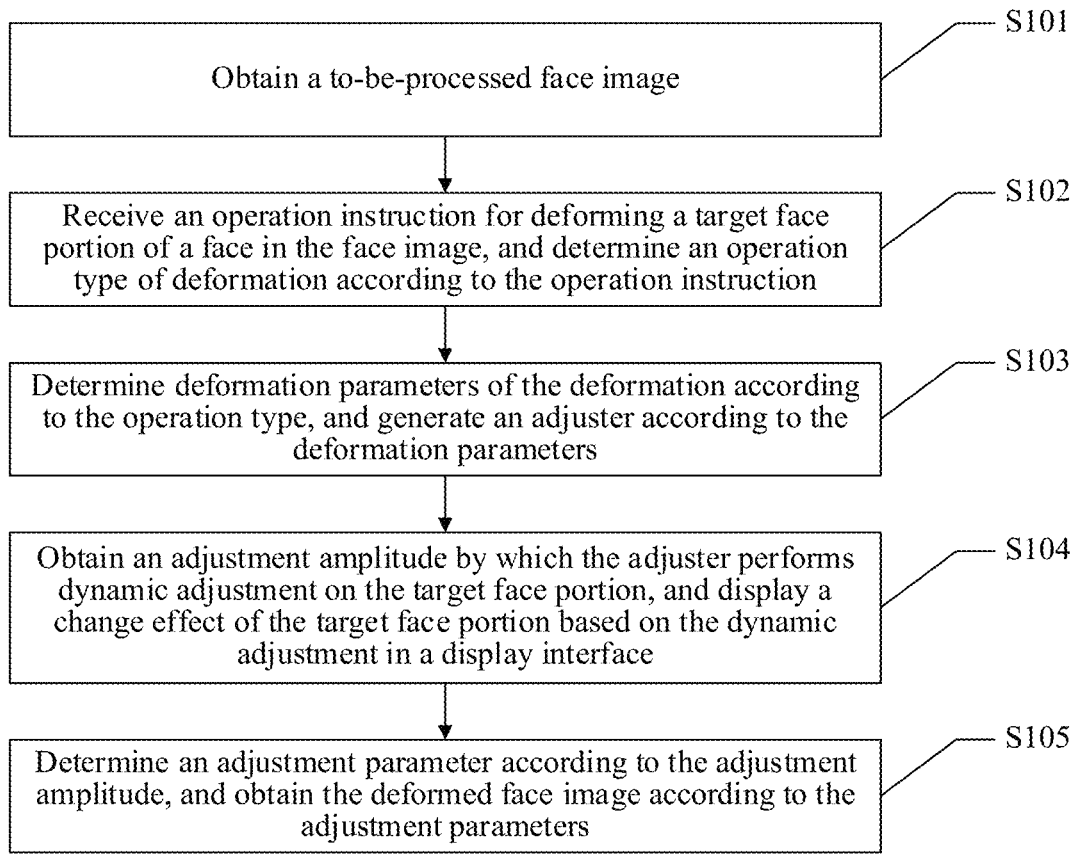
FIG. 2 is a schematic flowchart of a face image processing method according to an embodiment of this application.

FIG. 2 is a schematic flowchart of a face image processing method according to an embodiment of this application. The face image processing method may include the following steps:

Step S101. Obtain a to-be-processed face image.

The to-be-processed face image may include one or more faces, and may further include other objects. The face included in the face image may be a face to the front (that is, a front face), or a face at any angle (that is, a side face).

The manner for obtaining the face image may be as follows: during photographing, the face image processing apparatus acquires the face image by using a photographing camera; or the face image processing apparatus obtains a prestored face image from a local storage space; or the face image processing apparatus obtains the face image from an image database on a server. Certainly, the face image may alternatively be obtained in another manner, and the specific obtaining manner is not limited herein.

Step S102. Receive an operation instruction for deforming a target face portion of a face in the face image, and determine an operation type of deformation according to the operation instruction.

The face image processing apparatus may detect in real time or at intervals of a preset time whether the operation instruction is received. The operation instruction is used for instructing to perform a deformation operation on the target face portion of the face in the face image. The target face portion is a to-be-deformed face portion. The face portion may include eyes, eyebrows, a nose, a mouth, a face, and the like. A plurality of operation types of the deformation corresponding to each face region may be included. For example, the operation types of the deformation corresponding to the face portion may include adjusting an angle, an eyebrow distance, and a position of the eyebrows, adjusting a size, a width, a thickness, and a position of the mouth, adjusting a size, a wing, a bridge, a tip, and a position of the nose, adjusting a size, an eye height, an eye distance, an inclination, an eye brightening degree, and eye bag removing of the eyes, and adjusting an overall contour, cheeks, a chin, and a forehead of the face. When receiving the operation instruction, the face image processing apparatus may determine the operation type of the deformation according to the operation instruction. When the operation instruction is not received, the subsequent operations such as determining the operation type of the deformation according to the operation instruction may not be performed.

In some implementations, before the step of receiving an operation instruction for deforming a target face portion of a face in the face image, and determining an operation type of deformation according to the operation instruction, the face image processing method may further include: performing feature point detection on the face in the face image, to obtain feature points of face portions; and determining a to-be-deformed face portion in the face image according to the feature points, to obtain a target face portion.

After obtaining the to-be-processed face image, the face image processing apparatus may perform the feature point detection on the face in the face image by using a face detection and registration technology. For example, the face image processing apparatus may detect the face portions such as the eyes, the nose, the eyebrows, the mouth, and the face in the face image, to obtain feature points of the face portions. The feature points may be coordinate points of key points of the face portions.

Figure 3A:
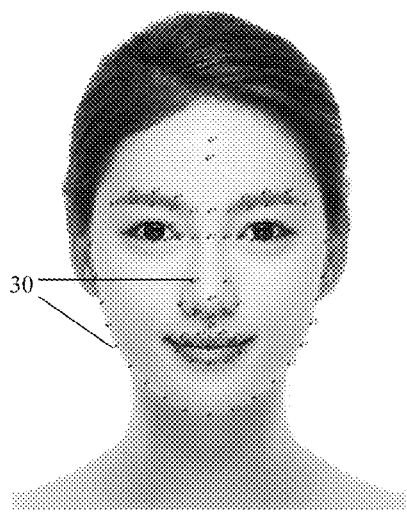
FIG. 3a is a schematic diagram of performing feature point detection on face organs according to an embodiment of this application.
Figure 3B:
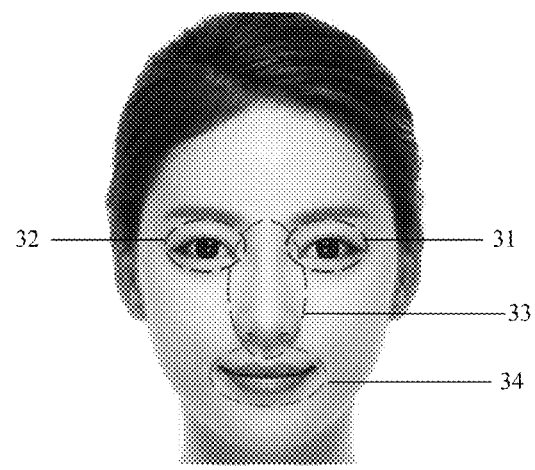
FIG. 3b is a schematic diagram of region division of face organs according to an embodiment of this application.

For example, as shown in FIG. 3a, the face image processing apparatus may detect the face portions of the face in the face image, to obtain the feature points corresponding to the face portions. The feature points (referring to a mark number 30 in FIG. 3a) may be on an outer contour of the face and an edge or a center of the face portions. There may be 90, 83, or 68 feature points, and the specific quantity may be flexibly set according to actual requirements. The feature points may have corresponding numbers. Based on the feature points of the face portions obtained by performing the feature point detection on the face portions, the face image processing apparatus may divide regions in which the face portions are located, so that the regions such as the face, the mouth, the nose, the eyes, and the eyebrows may be formed. For example, FIG. 3b shows regions of a left eye 31, a right eye 32, a nose 33, and a mouth 34. In this case, a to-be-deformed face portion in the face image may be determined according to the feature points, to obtain a target face portion. For example, a region in which the eyebrows are located in the face image may be determined according to 8 feature points of the eyebrows.

According to the embodiments of this application, the step of performing feature point detection on the face in the face image, to obtain feature points of face portions may include: recognizing the face in the face image, to obtain a face region; and detecting the face portions in the face region, to obtain the feature points of the face portions.

Specifically, the face image processing apparatus may first recognize the face in the face image. For example, when the face image includes a face of a user A, the face image processing apparatus may recognize, from the face image, a face region 1 in which the face of the user A is located; or when the face image includes faces of a user A, a user B, and a user C, the face image processing apparatus may recognize, from the face image, a face region 1, a face region 2, and a face region 3 in which the faces of the user A, the user B, and the user C are located respectively.

After obtaining the face region in the face image, the face image processing apparatus may detect the face portions in the face region. For example, the face portions such as a left eye, a right eye, a nose, a left eyebrow, a right eyebrow, a chin, and a mouth in the face region may be detected, to obtain the face portions. In this case, the face image processing apparatus may set a preset quantity of feature points for the feature portions, and obtain the feature points of the face portions according to the regions in which the face portions are located. For example, 8 feature points of the left eyebrow, 14 feature points of the nose, and 9 feature points of the eyes may be obtained. When a plurality of faces need to be detected, face portions may be detected in the face region 1 in which the face of the user A is located, to obtain feature points of the face portions corresponding to the user A, face portions may be detected in the face region 2 in which the face of the user B is located, to obtain feature points of the face portions corresponding to the user B, and the like.

In some implementations, the step of determining a to-be-deformed face portion in the face image according to the feature points, to obtain a target face portion may include: determining, according to the feature points, a region in which the face portions in the face image are located; obtaining a mapping relationship between an instruction identifier and a region identifier in response to receiving a selection instruction; determining, according to the mapping relationship, a region identifier corresponding to the instruction identifier of the selection instruction, to obtain a target region identifier; and determining a to-be-deformed face portion in the face image according to the target region identifier, to obtain the target face portion.

Specifically, the face image processing apparatus may preset the instruction identifier for each selection instruction, preset the region identifier for each organ region, and preset the mapping relationship between the instruction identifier of the selection instruction and the region identifier of the regions in which the face portions are located. The instruction identifier may be a number or a name of the selection instruction. The region identifier may be a number or a name of the organ region. For example, a mapping relationship between an instruction identifier 1 of a selection instruction 1 and a region identifier 1 of the eyes, a mapping relationship between an instruction identifier 2 of a selection instruction 2 and a region identifier 2 of the nose, and a mapping relationship between an instruction identifier 3 of a selection instruction 3 and a region identifier 3 of the mouth may be set. After the mapping relationship is obtained, the mapping relationship between the instruction identifier and the region identifier may be stored in the face image processing apparatus or the server.

After obtaining the feature points of the face portions, the face image processing apparatus may separately determine, according to the feature points of the face portions, the regions in which the face portions are located. For example, a region in which the left eyebrow is located in the face image may be determined according to the 8 feature points of the left eyebrow, a region in which the nose is located in the face image may be determined according to the 14 feature points of the nose, and a region in which the right eye is located in the face image may be determined according to the 9 feature points of the right eye.

The face image processing apparatus may detect whether the selection instruction is received. The selection instruction may be used for selecting the to-be-deformed face portion. When the selection instruction is not received, subsequent operations such as obtaining the mapping relationship between the instruction identifier and the region identifier may not be performed. When the selection instruction is received, the mapping relationship between the instruction identifier and the region identifier may be obtained locally or from the server, the instruction identifier of the received selection instruction may be obtained, and then the region identifier corresponding to the instruction identifier of the selection instruction may be determined according to the mapping relationship, to obtain a target region identifier. In this case, a corresponding region may be determined according to the target region identifier, and the to-be-deformed face portion in the face image is determined according to the region, to obtain a target face portion.

In some implementations, the step of receiving an operation instruction for deforming a target face portion of a face in the face image, and determining an operation type of deformation according to the operation instruction includes: receiving a deformation request, and generating a deformation operation interface according to the deformation request, the deformation operation interface including a portion selection interface and a type setting interface; receiving, through the portion selection interface, the operation instruction for deforming the target face portion of the face in the face image; and selecting the operation type of the deformation through the type setting interface according to the operation instruction.

Specifically, the face image processing apparatus may detect whether the deformation request is received. The deformation request is used for triggering a deformation operation on the target face portion of the face in the face image. When receiving the deformation request, the face image processing apparatus may generate the deformation operation interface according to the deformation request. In the deformation operation interface, a user may select a to-be-deformed target face portion, an operation type, and an adjustment parameter. The deformation operation interface includes the portion selection interface and the type setting interface. The portion selection interface may be used for receiving the operation instruction, and the type setting interface may be used for selecting the operation type, and the like. Forms of the portion selection interface and the type setting interface may be flexibly set according to actual requirements. For example, a form such as an input text box, a selection button, or a selection list may be used. In this case, the face image processing apparatus may receive, through the portion selection interface, the operation instruction for deforming the target face portion of the face in the face image by the user, and select the operation type, and the like of the deformation through the type setting interface according to the operation instruction.

Step S103. Determine deformation parameters of the deformation according to the operation type, and generate an adjuster according to the deformation parameters.

The deformation parameters may include: a deformation center, a deformation radius, a deformation type, a deformation intensity, and the like. The adjuster may correspond to one or more deformation units, and each deformation unit is provided with the deformation parameters. When dynamic adjustment is performed on the target face portion by using the adjuster, the adjuster may be triggered to invoke one or more deformation units, and the dynamic adjustment is performed on the target face portion according to deformation parameters of each invoked deformation unit. The adjuster may include a visible adjuster or an invisible adjuster. The visible adjuster may be displayed in the display interface, and may include a slider form, an arrow form, or the like. The visible adjuster may be normally displayed in the display interface, or may be displayed in the display interface in a form of a hidden button, and the adjuster may be displayed by clicking the hidden button. The invisible adjuster may be not displayed in the display interface. For example, an adjustment amplitude of the adjustor may be controlled by sliding the screen left or right, or an adjustment amplitude of the adjustor may be controlled by sliding the screen up or down, thereby greatly saving the display space of the display interface.

In some implementations, the step of determining deformation parameters of the deformation according to the operation type, and generating an adjuster according to the deformation parameters may include: obtaining a deformation unit set corresponding to the operation type, and determining deformation parameters corresponding to each deformation unit in the deformation unit set; and generating the adjuster according to the deformation parameters.

In some implementations, before the step of obtaining a deformation unit set corresponding to the operation type, the face image processing method may further include: setting corresponding deformation unit sets for the operation types respectively, and establishing a one-to-one correspondence between each operation type and the respective corresponding deformation unit set.

The face image processing apparatus may preset the deformation unit set that corresponds to each deformation corresponding to each operation type. The deformation unit set may include one or more deformation units. For example, an operation type for adjusting the eyebrow distance of the eyebrows may correspond to n1 deformation units, an operation type for adjusting the mouth size may correspond to n2 deformation units, an operation type for adjusting the nose position may correspond to n3 deformation units, an operation type for adjusting the eye distance of the eyes may correspond to n4 deformation units, and an operation type for adjusting the overall contour of the face may correspond to n5 deformation units. Values of n1, n2, n3, n4 and n5 may be flexibly set according to actual requirements. After the corresponding deformation unit sets are set for the operation types respectively, the one-to-one correspondence between each operation type and the respective corresponding deformation unit set may be established. For example, a correspondence between identifiers of the operation types and set identifiers of the respective corresponding deformation unit sets is established, and the correspondence is stored in the face image processing apparatus or the server.

Figure 4:
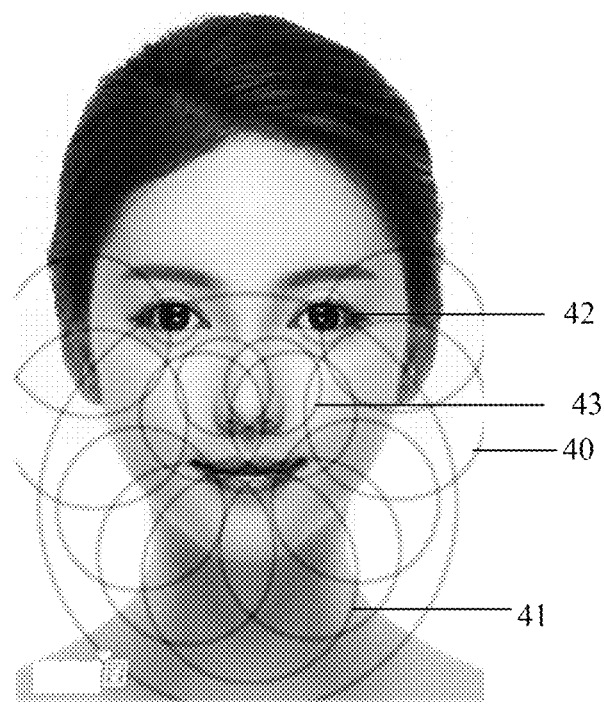
FIG. 4 is a schematic diagram of a deformation unit set according to an embodiment of this application.

A shape, a size, a position, and the like of the deformation unit may be flexibly set according to actual requirements. For example, each deformation unit in one deformation unit set may be circular. Positions of the deformation units may be different. Sizes of some of the deformation units in one deformation unit set may be the same, while sizes of the other deformation units may be different. For example, as shown in FIG. 4, each circle in FIG. 4 represents each corresponding deformation unit. For example, circles 40 and 41 at the periphery of the face are deformation units corresponding to operation types of adjusting the cheeks and the chin of the face; a circle 42 at the eye position is a deformation unit corresponding to an operation type of adjusting the size of the eyes, and a circle 43 around the nose is a deformation unit corresponding to an operation type of adjusting the width of the nose.

The face image processing apparatus may further set deformation parameters for each deformation unit. The deformation parameters may include a deformation center, a deformation radius, a deformation type, a deformation intensity, and the like. The deformation center is a center of the deformation unit, the deformation radius is a radius of the deformation unit, the deformation type may include: zooming in, zooming out, or pushing, and the deformation intensity may include: a zoom-in force, a zoom-out force, or a pushing force. The deformation parameters of the deformation unit may be used for performing a corresponding deformation operation on the face portion in the deformation unit according to the deformation parameters. A mapping relationship between the deformation parameters of the deformation units and the respective corresponding deformation unit may be established, and the mapping relationship between the deformation parameters and the deformation unit may be stored.

After determining the operation type, the face image processing apparatus may obtain a deformation unit set corresponding to the operation type, and determine deformation parameters corresponding to each deformation unit in the deformation unit set.

In some implementations, the step of obtaining a deformation unit set corresponding to the operation type, and determining deformation parameters corresponding to each deformation unit in the deformation unit set may include: obtaining a correspondence between the operation type and the deformation unit set, and determining, based on the correspondence, the deformation unit set corresponding to the operation type; and obtaining a deformation center, a deformation radius, a deformation type, and a deformation intensity corresponding to each deformation unit in the deformation unit set.

Because the face image processing apparatus presets the one-to-one correspondence between each operation type and the respective corresponding deformation unit set, the face image processing apparatus may obtain the one-to-one correspondence between each operation type and the respective corresponding deformation unit set locally or from the server, and determine, based on the correspondence, the deformation unit set corresponding to the operation type. For example, the correspondence between an identifier of each operation type and a set identifier of the respective corresponding deformation unit set may be obtained, and the identifier of the operation type is obtained. Then, the set identifier corresponding to the identifier of the operation type is determined according to the correspondence, and the deformation unit set corresponding to the set identifier is determined, so that the obtained deformation unit set is the deformation unit set corresponding to the operation type.

After the deformation unit set corresponding to the operation type is determined, the deformation parameters corresponding to each deformation unit in the deformation unit set may be obtained. Because the face image processing apparatus presets the deformation parameters for each deformation unit, and stores the mapping relationship between the deformation parameters and the deformation unit, the face image processing apparatus may obtain the mapping relationship between the deformation parameters and the deformation unit, and obtain, according to the mapping relationship between the deformation parameters and the deformation unit, the deformation parameters corresponding to each deformation unit in the deformation unit set. The deformation parameters of each deformation unit may include the deformation center, the deformation radius, the deformation type, the deformation intensity, and the like. After the deformation parameters are obtained, an adjuster may be generated according to the deformation parameters.

Step S104. Obtain an adjustment amplitude by which the adjuster performs dynamic adjustment on the target face portion, and display a change effect of the target face portion based on the dynamic adjustment in a display interface.

After the adjuster is generated, the dynamic adjustment may be performed on the target face portion by using the adjuster. For example, the eyes may be zoomed in by a first amplitude, then be zoomed in by a second amplitude, and then be zoomed out by a third amplitude by using the adjuster. In this case, the face image processing apparatus may obtain the adjustment amplitude by which the adjuster performs the dynamic adjustment on the target face portion, for example, may obtain a first adjustment amplitude by which the dynamic adjustment is performed on a cheek portion by sliding the screen left, and obtain a second adjustment amplitude by which the dynamic adjustment is performed on the cheek portion by sliding the screen right. The adjustment amplitude may determine a deformation degree. It may be that a larger adjustment amplitude indicates a larger deformation degree; and a smaller adjustment amplitude indicates a smaller deformation degree. To help the user to observe the effect of dynamic adjustment in real time, in the process of performing dynamic adjustment on the target face portion, the change effect of the target face portion based on the dynamic adjustment may be displayed in the display interface, for the user's reference to further perform the dynamic adjustment, so that the effect required by the user can be obtained in a short time, and misoperations can be reduced.

Step S105. Determine an adjustment parameter according to the adjustment amplitude, and obtain the deformed face image according to the adjustment parameter.

In some implementations, the step of determining an adjustment parameter according to the adjustment amplitude may include: obtaining a mapping relationship between adjustment amplitudes and adjustment parameters; and determining, according to the mapping relationship, the adjustment parameter corresponding to the adjustment amplitude.

The face image processing apparatus may preset the mapping relationship between the adjustment amplitudes and the adjustment parameters. When the adjustment parameter needs to be determined according to the adjustment amplitude, the face image processing apparatus may determine, according to the mapping relationship, the adjustment parameter corresponding to the adjustment amplitude.

After obtaining the adjustment parameter, the face image processing apparatus may perform a deformation operation on a to-be-deformed target face portion according to the adjustment parameter, to obtain a deformed face image. For example, the face image processing apparatus may extract, according to the adjustment parameter, the deformation center, the deformation radius, the deformation type, the deformation intensity, and the like from the deformation parameters corresponding to each deformation unit, determine a deformation region of each deformation unit according to the deformation center and the deformation radius, determine a region of the to-be-deformed target face portion included in each deformation unit according to the deformation region, separately calculate an adjustment position of the region of the target face portion included in each deformation unit (for example, may calculate adjustment positions of pixel points of the to-be-deformed target face portion included in each deformation unit) according to the deformation type and the deformation intensity, and perform a deformation operation on the region of the target face portion according to the adjustment position. For example, the face image processing apparatus may separately calculate, according to the deformation type and the deformation intensity of each deformation unit, moving positions of all or some pixel points of the to-be-deformed face portion included in the deformation unit, and perform a deformation operation on a to-be-deformed target organ according to the moving position.

In some implementations, the step of obtaining the deformed face image according to the adjustment parameter may include:

performing grid division on the face image, and determining a grid region in which the target face portion is located, to obtain a target grid region; performing a deformation operation on the target grid region included in each deformation unit according to the adjustment parameter, to obtain a deformed grid region; and constructing a deformed face portion according to the deformed grid region, and obtaining the deformed face image according to the deformed face portion.

The face image processing apparatus may calculate the adjustment positions of the pixel points of the to-be-deformed target face portion according to the adjustment parameter, and adjust the pixel points of the target face portion according to the adjustment position obtained through calculation, to achieve the objective of deforming the target face portion. Because the target face portion may include more pixel points, to reduce the calculation amount, and improve the processing efficiency, only the adjustment positions of some pixel points in the target face portion may be calculated. For example, the grid division may be performed on the face image, and then only an adjustment position of a vertex of the grid region in which the target face portion is located is calculated, to achieve the objective of deforming the target face portion.

Figure 5A:
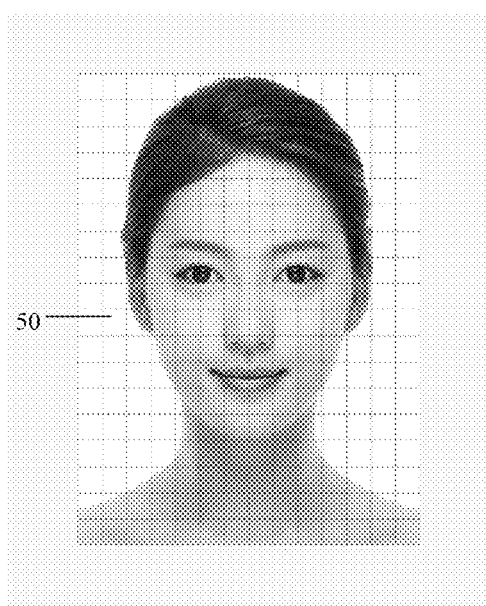
FIG. 5a is a schematic diagram of performing grid division on a face image according to an embodiment of this application.
Figure 5B:
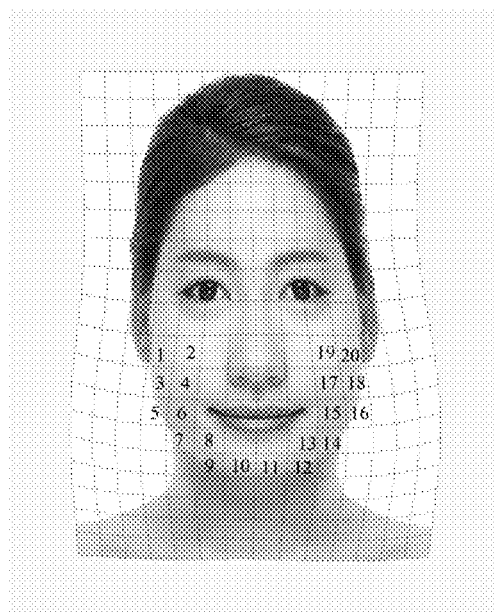
FIG. 5b is a schematic diagram of a deformed grid region according to an embodiment of this application.

Specifically, first, the grid division may be performed on the face image according to a preset algorithm, to obtain a plurality of grid regions. For example, as shown in FIG. 5a, the face image may be divided into 14*18 grids (as shown in the mark number 50). The preset algorithm may be flexibly set according to an actual requirement. For example, the grid division may be performed according to a size of the face image. For example, the face image may be divided into 50*66 rectangular grids, or the face image may be divided into 60*80 rectangular grids. Alternatively, the grid division may be performed according to a size of the face portion in the face image. Then, the grid regions in which the to-be-deformed target face portion is distributed may be determined according to the feature points of the face portions obtained by performing the feature point detection on the face portion in the face image, to obtain the target grid region. For example, the to-be-deformed target face portion may be distributed over 6 grid regions or 18 grid regions. That is, the target grid region may include 6 grid regions or 18 grid regions. In addition, the target grid region that is included in each deformation unit in the deformation unit set and that corresponds to the to-be-deformed target face portion is determined, and the deformation operation is performed on the target grid region included in each deformation unit according to the adjustment parameter, to obtain a deformed grid region. For example, when a deformation unit set 1 corresponding to a to-be-deformed target face portion A includes 3 deformation units, and a target grid region corresponding to the to-be-deformed target face portion A includes 6 grid regions, a deformation operation may be performed on 1 grid region included in a deformation unit 1 according to the adjustment parameter, a deformation operation may be performed on three grid regions included in a deformation unit 2 according to the adjustment parameter, and a deformation operation may be performed on two grid regions included in a deformation unit 3 according to the adjustment parameter, so that the deformed grid regions may be obtained. In the processes of performing the deformation operation on the deformation units, after the target grid region included in each deformation unit is deformed, processing such as fusion may be performed on a deformation effect corresponding to each deformation unit, so that the obtained deformed face portion can achieve a smoothing effect. Finally, a deformed face portion may be constructed according to the deformed grid region, and a deformed face image may be obtained according to the deformed face portion, for example, as shown in FIG. 5b.

In some implementations, the step of performing a deformation operation on the target grid region included in each deformation unit according to the adjustment parameter, to obtain a deformed grid region may include:

separately calculating an adjustment position of the target grid region included in each deformation unit according to the adjustment parameter; and adjusting the target grid region according to the adjustment position, to obtain the deformed grid region.

Figure 6:
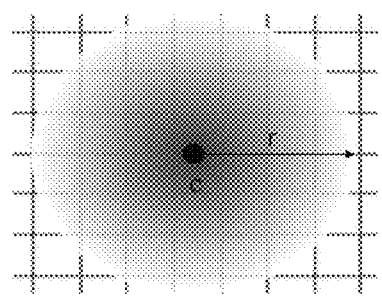
FIG. 6 is a schematic diagram of a deformation unit according to an embodiment of this application.

In the process of performing the deformation operation on the target grid region, the adjustment position of the target grid region included in each deformation unit may be separately calculated according to the adjustment parameter. For example, as shown in FIG. 6, the deformation parameters may be determined according to the adjustment parameter, and the target grid region included in each deformation unit may be determined according to a deformation center c and a deformation radius r in the deformation parameters. Then, an adjustment position of a vertex of the target grid region is calculated according to the deformation type, the deformation intensity, and the like in the deformation parameters, and the target grid region is adjusted according to the adjustment position, to obtain the deformed grid region. The vertex position of the grid region may be adjusted only, thereby improving the processing efficiency.

In some implementations, the step of separately calculating an adjustment position of the target grid region included in each deformation unit according to the adjustment parameter may include:

determining, according to the adjustment parameter, the deformation parameters corresponding to each deformation unit, and extracting the deformation center, the deformation radius, the deformation type, and the deformation intensity from the deformation parameters corresponding to each deformation unit; determining a deformation region of each deformation unit according to the deformation center and the deformation radius, and determining the target grid region included in each deformation unit according to the deformation region; and separately calculating the adjustment position of the target grid region included in each deformation unit according to the deformation type and the deformation intensity.

Specifically, after the dynamic adjustment is performed on the target face portion by using the adjuster, an adjustment amplitude corresponding to the dynamic adjustment may be determined, and the adjustment parameter may be determined according to the adjustment amplitude. The adjustment parameter may include adjustment parameters corresponding to one or more deformation units. That is, one or more sets of adjustment parameters may be determined according to one adjustment amplitude, and each set of adjustment parameters is the deformation parameters corresponding to each deformation unit. That is, when dynamic adjustment is performed on the target face portion by using the adjuster, the adjuster may be triggered to invoke one or more deformation units, and the dynamic adjustment is performed on the target face portion according to deformation parameters of each invoked deformation unit. In this case, the deformation parameters corresponding to each deformation unit may be determined according to the adjustment parameter. Because the deformation parameters may include a deformation center, a deformation radius, a deformation type, a deformation intensity, and the like, the face image processing apparatus may extract the deformation center, the deformation radius, the deformation type, the deformation intensity, and the like from the deformation parameters corresponding to each deformation unit. The deformation center is a center of the deformation unit, the deformation radius is a radius of the deformation unit, the deformation type may include: zooming in, zooming out, or pushing, and the deformation intensity may include a zoom-in force, a zoom-out force, or a pushing force. The deformation center, the deformation radius, and the deformation type may be preset according to requirements of the deformation unit. A closer distance to the center of the deformation unit in the same deformation unit indicates a larger deformation intensity. On the contrary, a longer distance to the center of the deformation unit indicates a smaller deformation intensity. In this case, the face image processing apparatus may determine a deformation region of each deformation unit according to the deformation center and the deformation radius, and determine the target grid region included in each deformation unit according to the deformation region. Then, adjustment positions of vertices or a plurality of pixel points of the target grid region included in each deformation unit are separately calculated according to the deformation type and the deformation intensity.

For example, as shown in FIG. 7, when the width of the right eye needs to be adjusted, a deformation unit set corresponding to the right eye may be obtained according to the adjustment parameter, deformation parameters corresponding to each deformation unit in the deformation unit set may be obtained, grid division is performed on the face image, a grid region in which the right eye is located may be determined, the deformation parameters corresponding to each deformation unit may be determined, and an adjustment position of the grid region in which the right eye is located included in each deformation unit may be separately calculated according to the deformation parameters corresponding to each deformation unit. For example, the deformation center, the deformation radius, the deformation type, the deformation intensity, and the like may be extracted from the deformation parameters corresponding to each deformation unit. The deformation region of each deformation unit is determined according to the deformation center and the deformation radius, and the grid region in which the right eye is located included in each deformation unit is determined according to the deformation region. Then, an adjustment position of a vertex of the grid region included in each deformation unit is separately calculated according to the deformation type and the deformation intensity. The calculation method of the adjustment position of the vertex of the grid region may be as follows:

$$x_2 = (x_1 - center\_x) * a * mask * adjustValue$$

$$y_2 = (y_1 - center\_y) * a * mask * adjustValue$$

Figure 7A:
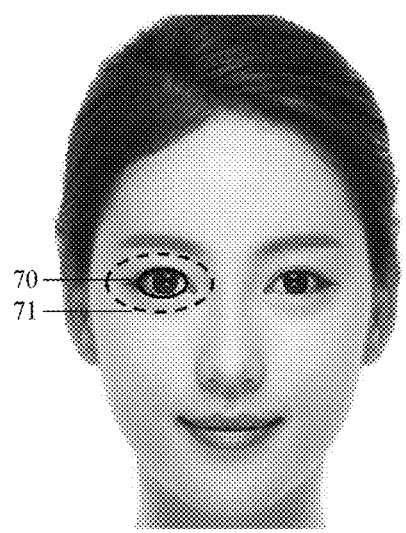
FIG. 7a is a schematic diagram of adjusting an eye width according to an embodiment of this application.
Figure 7B:
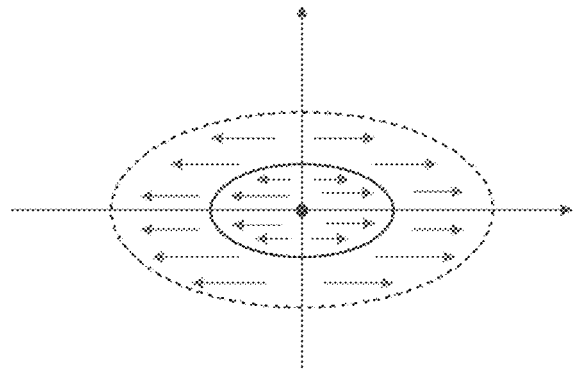
FIG. 7b is another schematic diagram of adjusting an eye width according to an embodiment of this application.

$x_2$ represents an x value of a vertex adjustment position (that is, a position in an x-axis direction after an offset), $x_1$ represents an x value before vertex adjustment, center_x represents an x value of a center of the grid region, a represents a constant coefficient, where a may be set to 1.3, or a value of a may be flexibly set according to actual requirements, mask represents the deformation intensity, adjustValue represents a deformation degree value, where the deformation degree value may be generated by adjusting an amplitude of a deformation strength sliding rod according to requirements by the user, $y_2$ represents a y value of the vertex adjustment position (that is, a position in a y-axis direction after the offset), $y_1$ represents a y value before the vertex adjustment, and center_y represents a y value of the center of the grid region. In this case, the grid region in which the right eye is located may be adjusted according to the adjustment position $(x_2, y_2)$, to obtain a deformed grid region, and a deformed right eye is constructed according to the deformed grid region. As shown in FIG. 7a, a region 70 surrounded by a solid line at the right eye is a right eye region before the deformation, and a region 71 surrounded by a dashed line is a right eye region after the deformation. As shown in FIG. 7b, a vertex (that is, a pixel point) in the region surrounded by the solid line may move to the outside of the solid line, and is expanded into the region surrounded by the dashed line, to obtain the deformed right eye.

In some implementations, the step of constructing a deformed face portion according to the deformed grid region, and obtaining the deformed face image according to the deformed face portion may include:

performing interpolation processing on pixels in the deformed grid region, to obtain pixel values corresponding to the deformed grid region; and constructing a deformed face portion according to the deformed grid region, and performing pixel rendering on the deformed face portion according to the pixel values, to obtain the deformed face image.

After the deformed grid region is determined, moving rendering of pixel points of the face image may be performed. For example, nearest neighbor interpolation, bilinear interpolation, pixel region relationship resampling, bicubic interpolation, and other interpolation methods may be used to perform the interpolation processing on the pixels in the deformed grid region, to obtain the pixel values corresponding to the deformed grid region. Then, the deformed face portion is constructed according to the deformed grid region, and the pixel rendering is performed on the deformed face portion according to the pixel values, to obtain the deformed face image.

Figure 8:
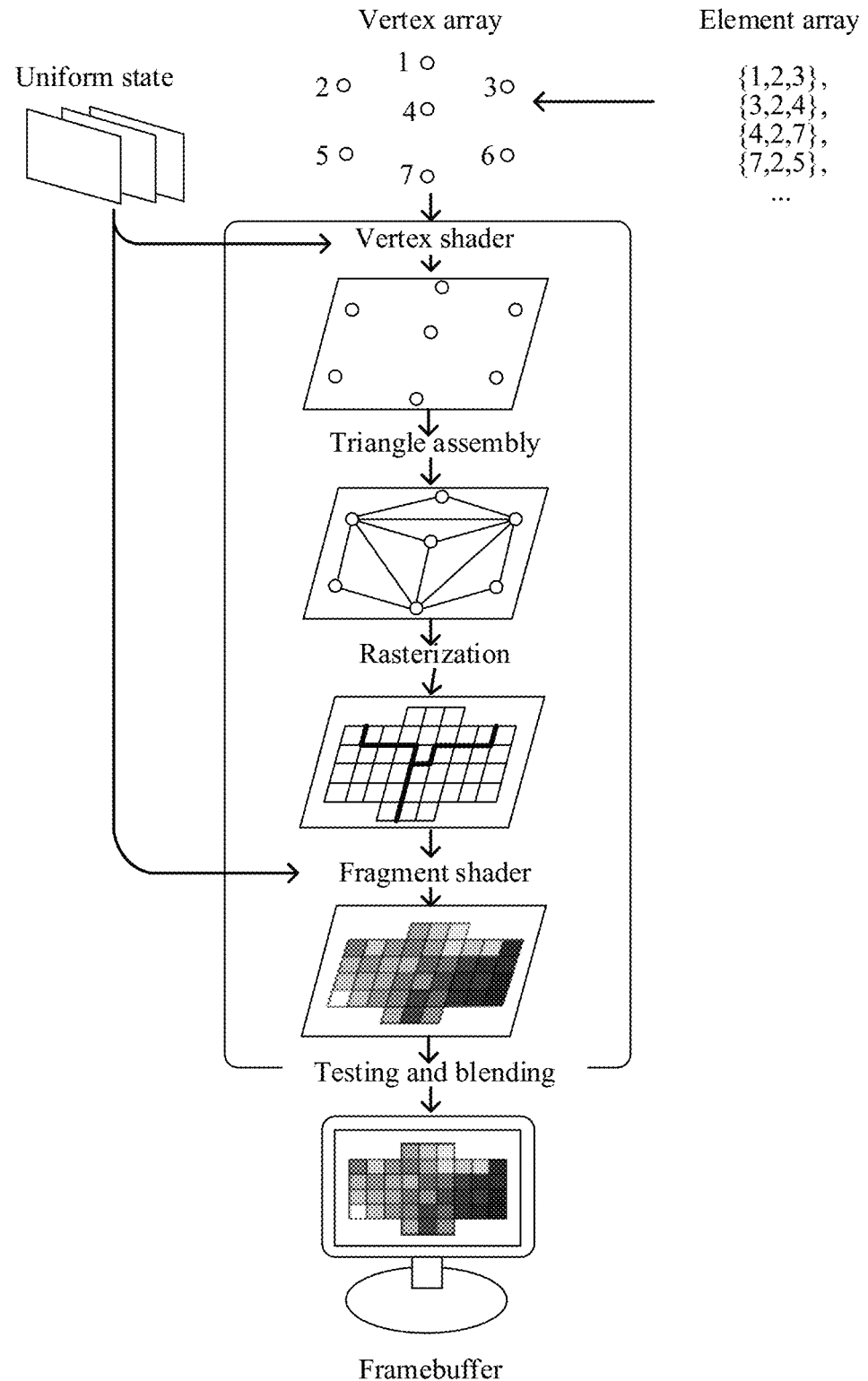
FIG. 8 is a schematic diagram of an image rendering pipeline according to an embodiment of this application.

The face portion deformation may be based on an image rendering principle. As shown in FIG. 8, an image rendering pipeline for image rendering is applied to a deformation scenario, and a simple and visual representation is moving positions of the pixel points. A specific way may be as follows: The face image is first divided into a plurality of grid regions. For example, an image at a 9:16 ratio may be divided into 50*66 grid regions. Then, a vertex array of a loaded grid region is used as an input to be transmitted to a vertex shader. In the vertex shader, vertex positions of the grid region are modified according to a shape that needs to be deformed. In a process of using the rendering pipeline, the vertex shader is responsible for determining the vertex positions, coordinates of the vertices of the grid region may be adjusted according to a deformation rule (that is, the deformation parameters of each deformation unit) in the vertex shader, and a fragment shader is responsible for drawing each pixel. Pixels inside each grid region make differences according to the coordinates of the vertices. Finally, the modified coordinates of the grid vertex positions are transformed into a screen coordinate system (that is, projected onto a screen for display).

It can be learned from the above that, in this embodiment of this application, the to-be-processed face image may be obtained, and the operation instruction for deforming the target face portion of the face in the face image may be received. The operation type of the deformation is determined according to the operation instruction. For example, the deformation operation may be performed on the mouth width, the eye size, or the face size. Then, the deformation parameters of the deformation are determined according to the operation type, and the adjuster is generated according to the deformation parameters. In this case, the adjustment amplitude by which the adjuster performs the dynamic adjustment on the target face portion may be obtained, and the change effect of the target face portion based on the dynamic adjustment is displayed in the display interface, for the user's reference to perform the dynamic adjustment. Finally, the adjustment parameter may be determined according to the adjustment amplitude, and the deformed face image is obtained according to the adjustment parameter. According to the solutions, a to-be-deformed target face portion may be determined according to division of the face portions, the adjuster is generated according to the deformation parameters to perform dynamic adjustment on the target face portion, and the change effect of the target face portion based on the dynamic adjustment is displayed for the user's reference, so that the deformed face image can be obtained without manually performing a blind pushing operation by the user in the face region, thereby improving the convenience and accuracy of processing the face image, improving the processing effect of the face image, and saving the processing time and the power.

According to the method described in the foregoing embodiments, a detailed description is further made below by using an example.

Figure 9:
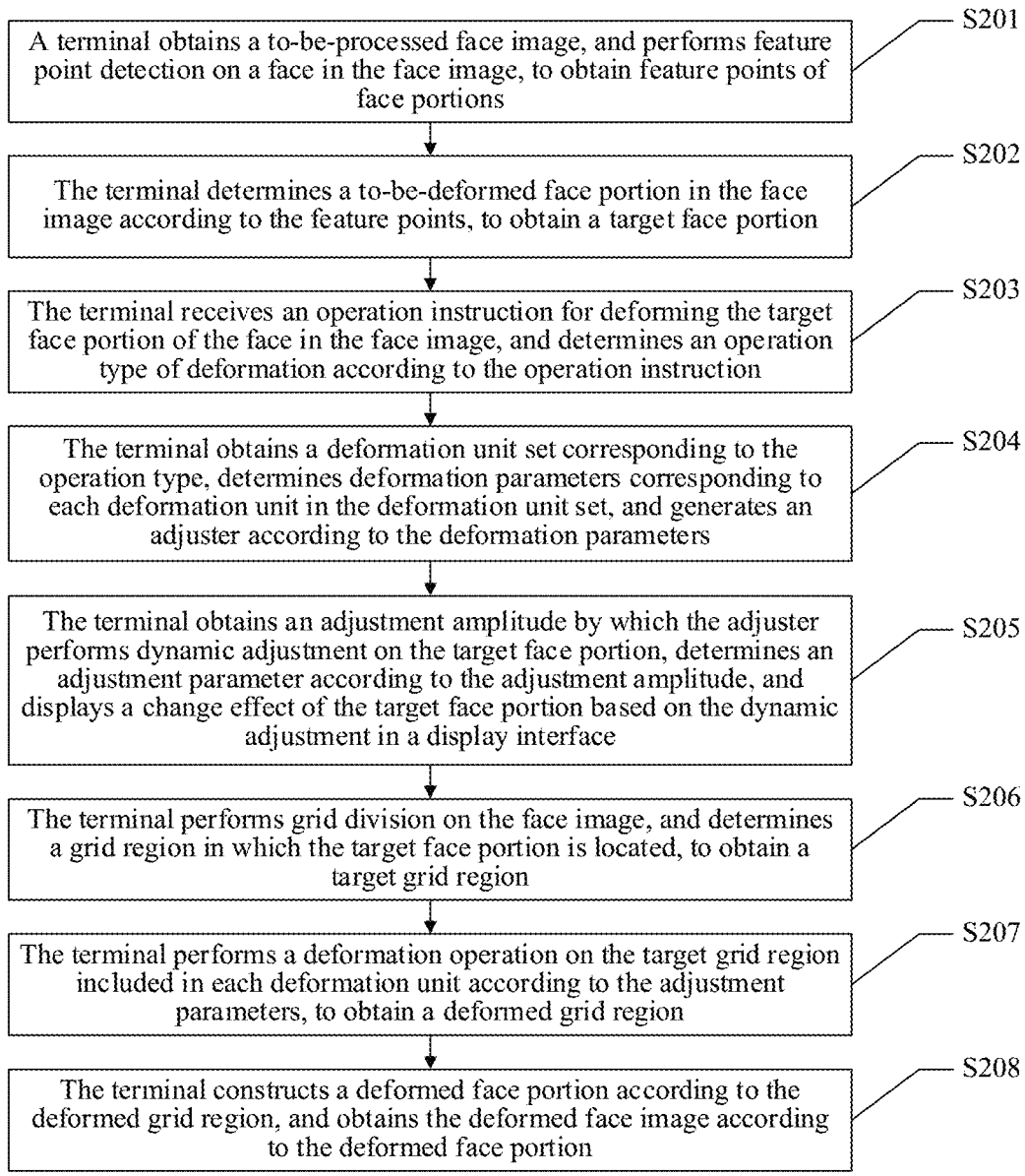
FIG. 9 is another schematic flowchart of a face image processing method according to an embodiment of this application.

This embodiment uses an example in which the face image processing apparatus is a terminal. The terminal may perform a deformation operation on the face portion in the face image. FIG. 9 is a schematic flowchart of a face image processing method according to an embodiment of this application. The method procedure may include the following steps:

S201. The terminal obtains a to-be-processed face image, and performs feature point detection on a face in a face image, to obtain feature points of face portions.

The terminal may preinstall an image processing application (APP). After the APP is started, the terminal may load the to-be-processed face image by using the APP. The face image may be a face image acquired by starting a photographing camera by the terminal, the terminal obtains the face image locally or from a server. The face image may include one or more faces, and may further include other objects. The face included in the face image may be a front face or a side face. The face portion may include eyes, eyebrows, a nose, a mouth, and a face.

After obtaining the to-be-processed face image, the terminal may perform feature point detection on the face portions in the face image, for example, perform the feature point detection on the face portions such as the eyes, the nose, the eyebrows, the mouth, and the face in the face image, to obtain feature points of the face portions, for example, as shown in FIG. 3a. The feature points may be on an outer contour of the face and an edge or a center of the face portions. There may be 90 or 83 feature points, and the specific quantity may be flexibly set according to actual requirements.

S202. The terminal determines a to-be-deformed face portion in the face image according to the feature points, to obtain a target face portion.

Based on the feature points of the face portions obtained by performing the feature point detection on the face portions, regions in which the face portions are located may be divided, so that the regions such as the face, the mouth, the nose, the eyes, and the eyebrows may be formed. For example, FIG. 3b shows the regions such the left eye, the right eye, the nose, and the mouth. In this case, the terminal may determine the to-be-deformed face portion in the face image according to the feature points, to obtain the target face portion. For example, when feature points of organs in the face are described by using 90 coordinate points, a region in which the facial contour is located in the face image may be determined according to 21 feature points corresponding to the facial contour, a region in which the left eye is located in the face image is determined according to 8 feature points corresponding to the left eye, a region in which the right eye is located in the face image is determined according to 8 feature points corresponding to the right eye, a region in which the pupil is located in the face image is determined according to 2 feature points corresponding to the pupil, a region in which the left eyebrow is located in the face image is determined according to 8 feature points corresponding to the left eyebrow, a region in which the right eyebrow is located in the face image is determined according to 8 feature points corresponding to the right eyebrow, a region in which the mouth is located in the face image is determined according to 22 feature points corresponding to the mouth, and a region in which the nose is located in the face image is determined according to 13 feature points corresponding to the nose.

S203. The terminal receives an operation instruction for deforming the target face portion of the face in the face image, and determines an operation type of deformation according to the operation instruction.

A plurality of operation types of the deformation corresponding to each face portion may be included. For example, the operation types of the deformation corresponding to the face portion may include adjusting an angle, an eyebrow distance, and a position of the eyebrows, adjusting a size, a width, a thickness, and a position of the mouth, adjusting a size, a wing, a bridge, a tip, and a position of the nose, adjusting a size, an eye height, an eye distance, an inclination, an eye brightening degree, and eye bag removing of the eyes, and adjusting an overall contour, cheeks, a chin, and a forehead of the face.

After loading the face image, for example, as shown in FIG. 10, the terminal may display a face portion list such as the face, the eyes, the nose, the mouth, and the eyebrows in the display interface of the face image for user selection. Each face portion may be subdivided into secondary portions. For example, the face may be divided into secondary portions such as a whole, cheeks, a chin, and a forehead correspondingly, and the eyes may be divided into secondary portions such as a size, an eye height, an eye distance, an inclination, eyes brightening, and eye bag removing correspondingly.

Figure 10B:
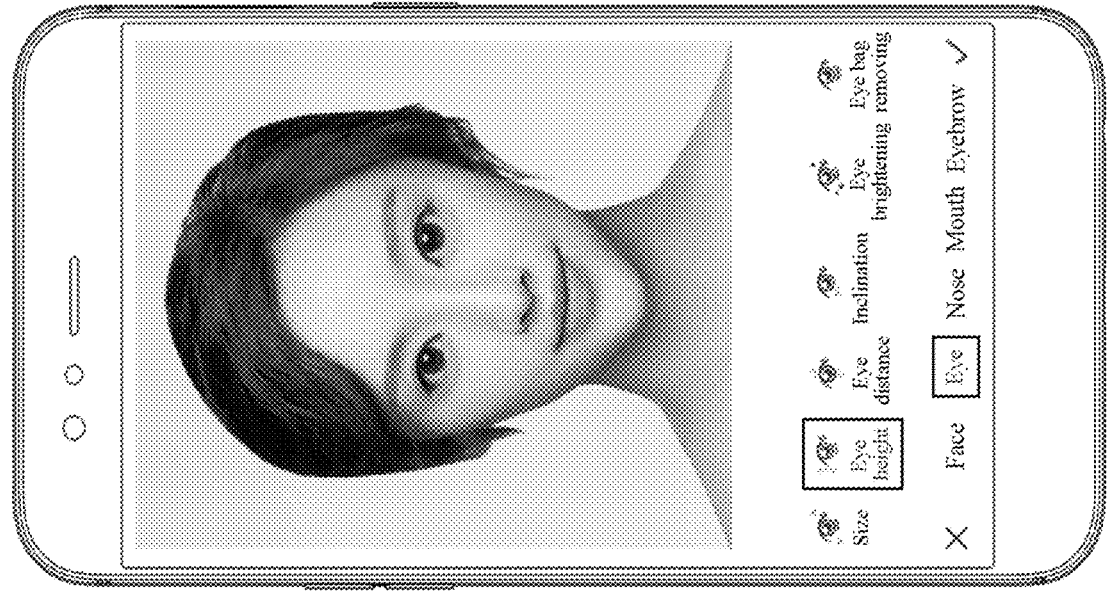
FIG. 10b is a schematic diagram of adjusting an eye height according to an embodiment of this application.
Figure 10A:
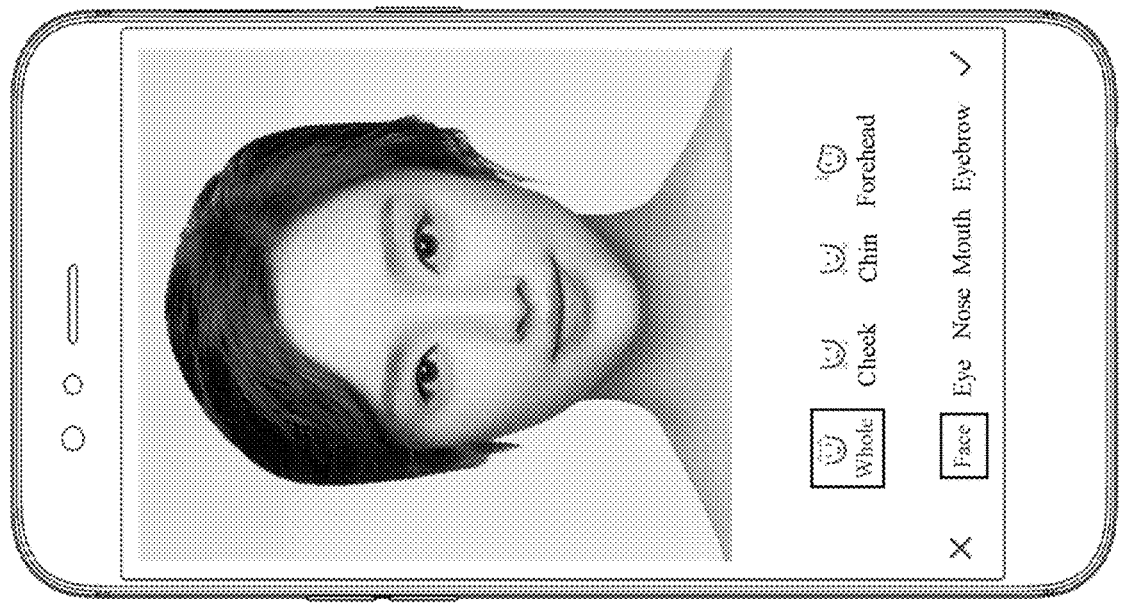
FIG. 10a is a schematic diagram of adjusting a whole face according to an embodiment of this application.

The terminal may receive, based on the displayed list, the operation instruction for deforming the target face portion of the face in the face image by the user. For example, the terminal may detect in real time or at intervals of a preset time whether the operation instruction is received. As shown in FIG. 10a, when the user selects a face and a corresponding whole of the face, the operation instruction may be generated, or as shown in FIG. 10b, when the user selects eyes and a corresponding eye height of the eyes, the operation instruction may be generated. When the operation instruction is received, the operation type of the deformation may be determined according to the operation instruction.

S204. The terminal obtains a deformation unit set corresponding to the operation type, determines deformation parameters corresponding to each deformation unit in the deformation unit set, and generates an adjuster according to the deformation parameters.

The deformation parameters may include a deformation center, a deformation radius, a deformation type, a deformation intensity, and the like. The adjuster may correspond to one or more deformation units, and each deformation unit is provided with the deformation parameters. When dynamic adjustment is performed on the target face portion by using the adjuster, the adjuster may be triggered to invoke one or more deformation units, and the dynamic adjustment is performed on the target face portion according to deformation parameters of each invoked deformation unit. The adjuster may include a visible adjuster or an invisible adjuster. The visible adjuster may be displayed in the display interface, and may include a slider form or an arrow form. The visible adjuster may be normally displayed in the display interface or may be displayed on the display interface in a form of a hidden button, and the adjuster may be displayed by clicking the hidden button. The invisible adjuster may be not displayed in the display interface. For example, an adjustment amplitude of the adjustor may be controlled by sliding the screen left or right, or an adjustment amplitude of the adjustor may be controlled by sliding the screen up or down.

The terminal may preset the deformation unit set that corresponds to each deformation corresponding to each operation type. The deformation unit set may include one or more deformation units. For example, adjustment on the eyebrow distance of the eyebrows may include N1 deformation units, adjustment on the eye distance of the eyes may include N2 deformation units, and adjustment on the overall contour of the face may include N3 deformation units. Values of N1, N2, and N3 may be flexibly set according to actual requirements. After the corresponding deformation unit sets are set for the operation types respectively, the one-to-one correspondence between each operation type and the respective corresponding deformation unit set may be established. For example, a correspondence between identifiers of the operation types and set identifiers of the respective corresponding deformation unit sets is established, and the correspondence is stored in the terminal or the server. A shape, a size, and a position of the deformation unit may be flexibly set according to actual requirements. For example, each deformation unit in one deformation unit set may be circular. Positions of the deformation units may be different. Sizes of some of the deformation units in one deformation unit set may be the same, or may be different. For example, as shown in FIG. 4, each circle in FIG. 4 represents each corresponding deformation unit.

The terminal may further set deformation parameters for each deformation unit. The deformation parameters may include a deformation center, a deformation radius, a deformation type, a deformation intensity, and the like. A mapping relationship between the deformation parameters of the deformation units and the respective corresponding deformation unit may be established, and the mapping relationship between the deformation parameters and the deformation unit may be stored. After determining the operation type, the terminal may obtain the one-to-one correspondence between each operation type and the respective corresponding deformation unit set locally or from the server, and determine, based on the correspondence, the deformation unit set corresponding to the operation type.

After determining the deformation unit set corresponding to the operation type, the terminal may obtain the mapping relationship between the deformation parameters and the deformation unit, and obtain, according to the mapping relationship between the deformation parameters and the deformation unit, the deformation parameters corresponding to each deformation unit in the deformation unit set. After the deformation parameters are obtained, an adjuster may be generated according to the deformation parameters. The deformation parameters of each deformation unit may include the deformation center, the deformation radius, the deformation type, the deformation intensity, and the like. The deformation center is a center of the deformation unit, the deformation radius is a radius of the deformation unit, the deformation type may include: zooming in, zooming out, or pushing, the deformation intensity may include: a zoom-in force, a zoom-out force, or a pushing force. The deformation degree may be determined by a sliding rod in the display interface. The deformation parameters of the deformation unit may be used for performing a corresponding deformation operation on the face portion in the deformation unit according to the deformation parameters.

S205. The terminal obtains an adjustment amplitude by which the adjuster performs dynamic adjustment on the target face portion, determines an adjustment parameter according to the adjustment amplitude, and displays a change effect of the target face portion based on the dynamic adjustment in a display interface.

After generating the adjuster, the terminal may perform dynamic adjustment on the target face portion by using the adjuster. In this case, the terminal may obtain the adjustment amplitude by which the adjuster performs the dynamic adjustment on the target face portion, for example, may obtain a first adjustment amplitude by which the dynamic adjustment is performed on a cheek portion by sliding the screen left, and obtain a second adjustment amplitude by which the dynamic adjustment is performed on the cheek portion by sliding the screen right. To help the user to observe the effect of dynamic adjustment in real time, in the process of performing dynamic adjustment on the target face portion, the change effect of the target face portion based on the dynamic adjustment may be displayed in the display interface, for the user's reference to further perform the dynamic adjustment, so that the effect required by the user can be obtained in a short time.

S206. The terminal performs grid division on the face image, and determines a grid region in which the target face portion is located, to obtain a target grid region.

The terminal may perform the grid division on the face image according to a preset algorithm, to obtain a plurality of grid regions. For example, as shown in FIG. 5*a*, the face image may be divided into 14*18 grids. Certainly, the preset algorithm may also be flexibly set according to actual requirements. For example, the grid division may be performed according to a size of the face image. For example, the face image may be divided into 50*66 rectangular grids, or the face image may be divided into 60*80 rectangular grids. Alternatively, the grid division may be performed according to a size of the face portion in the face image. Then, the grid regions in which the to-be-deformed target face portion is distributed may be determined according to the feature points of the face portions obtained by performing the feature point detection on the face portion in the face image, to obtain the target grid region. For example, a to-be-deformed nose in FIG. 5 may be distributed over 8 grid regions, or a to-be-deformed mouth may be distributed over 4 grid regions.

The terminal may determine the target grid region that is included in each deformation unit in the deformation unit set and that corresponds to the to-be-deformed target face portion, and perform the deformation operation on the target grid region included in each deformation unit according to the adjustment parameter, to obtain a deformed grid region. For example, as shown in FIG. 5*b*, when a deformation unit set corresponding to to-be-deformed cheeks includes 7 deformation units, and a target grid region corresponding to the cheeks includes 20 grid regions (that is, grid regions corresponding to regions numbered 1 to 20 in FIG. 5*b*), in this case, after dynamic adjustment is performed on the cheeks by an adjuster for adjusting cheeks, an adjustment amplitude corresponding to the dynamic adjustment may be determined, and an adjustment parameter may be determined according to the adjustment amplitude. The adjustment parameter may include adjustment parameters corresponding to one or more deformation units. Because the deformation unit set corresponding to the to-be-deformed cheeks includes 7 deformation units, the adjustment amplitude may correspond to the adjustment parameters of the 7 deformation units. In this case, the adjustment parameter of the 7 deformation units may be determined according to the adjustment amplitude of the adjuster for adjusting cheeks. The adjustment parameter may include deformation parameters such as a deformation center, a deformation radius, a deformation type, a deformation intensity, a deformation degree, and the like of the 7 deformation units. Then, a deformation operation may be performed, according to deformation parameters corresponding to a deformation unit 1, on S1 grid regions (including grid regions corresponding to regions numbered 1 to 4) included in the deformation unit 1, a deformation operation may be performed, according to deformation parameters corresponding to a deformation unit 2, on S2 grid regions (including grid regions corresponding to regions numbered 5 to 7) included in the deformation unit 2, and a deformation operation may be performed, according to deformation parameters corresponding to deformation units 3 to 7, on S3, S4, S5, S6 and S7 grid regions included in the deformation units 3 to 7, so that deformed grid regions may be obtained. An accumulated value of S1 to S7 is 20. In the process of performing the deformation operation on the 7 deformation units, processing such as effect fusion may be performed on the deformation corresponding to each deformation unit, and finally, a deformed face portion may be constructed according to the deformed grid regions, so that the deformed face portion may achieve a smoothing effect.

Specifically, the deformation parameters corresponding to each deformation unit may be determined according to the adjustment parameter. Because the deformation parameters may include a deformation center, a deformation radius, a deformation type, deformation intensity, a deformation degree, and the like, the terminal may extract the deformation center, the deformation radius, the deformation type, the deformation intensity, and the deformation degree, and the like from the deformation parameters corresponding to each deformation unit. The deformation center, the deformation radius, and the deformation type may be preset according to requirements of the deformation unit. A closer distance to the center of the deformation unit in the same deformation unit indicates a larger deformation intensity. On the contrary, a longer distance to the center of the deformation unit indicates a smaller deformation intensity. The deformation degree may be determined according to a sliding position of the sliding rod. A longer distance from a sliding button of the sliding rod to an origin indicates a larger deformation degree. On the contrary, a closer distance from the sliding button of the sliding rod to the origin indicates a smaller deformation degree. In this case, the terminal may determine a deformation region of each deformation unit according to the deformation center and the deformation radius, and determine the target grid region included in each deformation unit according to the deformation region. Then, adjustment positions of vertices or a plurality of pixel points of the target grid region included in each deformation unit are separately calculated according to the deformation type, the deformation intensity, and the deformation degree.

S207. The terminal performs a deformation operation on the target grid region included in each deformation unit according to the adjustment parameter, to obtain a deformed grid region.

For example, when the right eyebrow needs to be rotated, a deformation unit set corresponding to the right eyebrow may be obtained according to the adjustment parameter, deformation parameters corresponding to each deformation unit in the deformation unit set may be obtained, grid division may be performed on the face image, a grid region in which the right eyebrow is located may be determined, the deformation parameters corresponding to each deformation unit may be determined, and an adjustment position of the grid region in which the right eyebrow is located included in each deformation unit may be separately calculated according to the deformation parameters corresponding to each deformation unit. For example, the deformation center, the deformation radius, the deformation type, the deformation intensity, and the like may be extracted from the deformation parameters corresponding to each deformation unit. The deformation region of each deformation unit is determined according to the deformation center and the deformation radius, and the grid region in which the right eyebrow is located included in each deformation unit is determined according to the deformation region. Then, an adjustment position of a vertex of the grid region included in each deformation unit is separately calculated according to the deformation type and the deformation intensity. The calculation method of the adjustment position of the vertex of the grid region of the right eyebrow may be as follows:

```
rotatedPoint=leftEyebrowCenter.xy+rotate2DPoint(point.xy-
leftEyebrowCenter.xy,-eyebrowTiltAngle)
    vec2 rotate2DPoint(vec2 point,float angle)
    {
    return vec2(cos(angle)*point.x-
sin(angle)*point.y,sin(angle)*point.x+cos(angle)*point.y);
    }
```

Figure 11B:
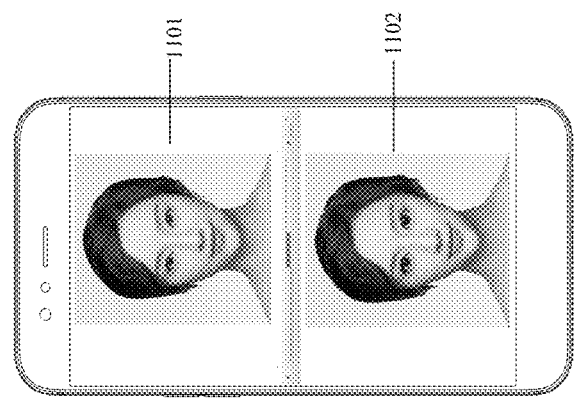
FIG. 11b is a schematic diagram of displaying face images before and after deformation in a split-screen manner according to an embodiment of this application.
Figure 11A:
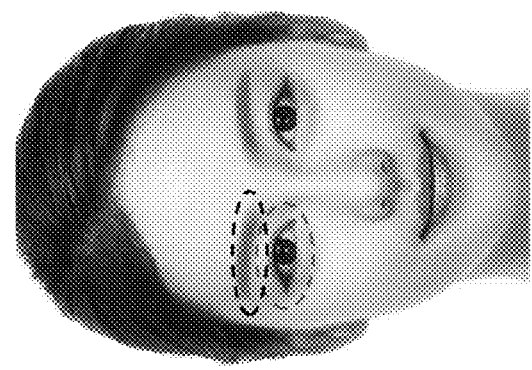
FIG. 11a is a schematic diagram of rotating eyebrows according to an embodiment of this application.

Note that rotatedPoint represents a rotation vector corresponding to the right eyebrow, and includes rotation angles of vertices of the grid region in which the right eyebrow is located or rotation angles of pixel points of the right eyebrow, leftEyebrowCenter, xy represents a midpoint position of the right eyebrow (that is, a midpoint of the grid region that needs to be calculated), point.xy represents position information of the pixel points (that is, the vertices of the grid region) that need to be calculated currently, eyebrowTiltAngle represents the rotation angle, vec2 point represents the pixel point that needs to be calculated, and corresponds to point.xy, angle represents the rotation angle, and corresponds to eyebrowTiltAngle, return represents going back, cos represents a cosine function, point.x represents an x value of a pixel point that needs to be calculated, sin represents a sine function, and point.y represents a y value of a pixel point that needs to be calculated. In this case, the grid region in which the right eyebrow is located may be adjusted according to the adjustment position, to obtain a deformed grid region, and a deformed right eyebrow is constructed according to the deformed grid region, thereby implementing rotation of the eyebrow. For example, as shown in FIG. 11a, the deformation operation may be performed on the right eyebrow. Because only the adjustment positions of the vertices of the grid region in which the right eyebrow is located is calculated and the adjustment positions of the pixel points of the right eyebrow do not need to be calculated, the calculation amount can be reduced, and the processing efficiency can be improved.

S208. The terminal constructs a deformed face portion according to the deformed grid region, and obtains the deformed face image according to the deformed face portion.

The terminal may construct the deformed face portion according to the deformed grid region, and perform pixel rendering on the deformed face portion using an image rendering principle. For example, the terminal performs interpolation processing on pixels in the deformed grid region, to obtain pixel values corresponding to the deformed grid region, constructs the deformed face portion according to the deformed grid region, and performs the pixel rendering on the deformed face portion according to the pixel values, to obtain the deformed face image.

After obtaining the deformed face image, the terminal may switch display of the face image before the deformation and the deformed face image through a comparison button, so as to help the user to compare the face image before the deformation with the deformed face image. In addition, the terminal may further display the face image before the deformation and the deformed face image in a split-screen manner. As shown in FIG. 11b, the terminal may divide a display screen into a first display screen 1101 and a second display screen 1102, display the face image before the deformation in the first display screen, and display the deformed face image in the second display screen.

The terminal may perform a deformation operation on different face portions, and finally display an overlaying effect after the deformation of different face portions. For example, as shown in FIG. 10, the terminal may first perform a face lifting operation on the whole face in the face image, to obtain a face-lifted face image, and then adjust the eye height of the eyes in the face-lifted face image, so as to obtain a face image in which the face is lifted and the eye height is adjusted.

In this embodiment of this application, a to-be-deformed target face portion may be determined according to division of the face portions, and the deformation operation is performed on the target face portion according to the deformation parameters that correspond to each deformation unit in the deformation unit set and that correspond to the to-be-deformed target face portion, to obtain the deformed face image without manually performing the pushing operation on the face region by the user, thereby breaking the defect of a conventional disperse operation of the face portions, and effectively reducing the unsatisfactory effect caused by a manual misoperation by the user, to obtain a deformed face image that more meets the expectation. Therefore, the face portions in the face image are accurately detected, to divide the face portion region, so that accurate control over different face portion regions can be implemented. In addition, real-time deformation of the face portions is added, so that the user may simply select the face portion region that needs to be deformed, to complete automatic deformation by using the adjuster, thereby improving the user operation convenience, and ensuring the good effect of deformation reshaping of the face image. The deformation effect may be further seen in real time in the same operation page, thereby greatly improving the convenience and efficiency of processing the face image.

To help better implement the face image processing method provided in the embodiments of this application, an apparatus based on the foregoing face image processing method is further provided in the embodiments of this application. Terms have meanings the same as those in the foregoing face image processing method. For specific implementation details, reference may be made to the description in the method embodiments.

Figure 12:
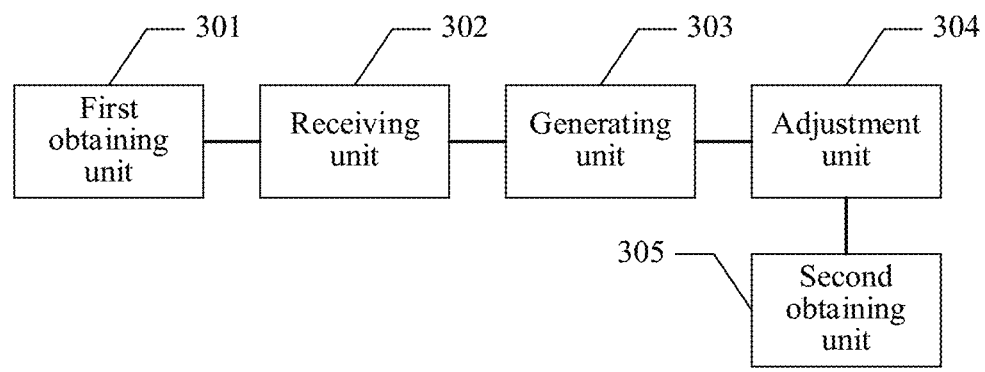
FIG. 12 is a schematic structural diagram of a face image processing apparatus according to an embodiment of this application.

FIG. 12 is a schematic structural diagram of a face image processing apparatus according to an embodiment of this application. The face image processing apparatus may include: a first obtaining unit 301, a receiving unit 302, a generating unit 303, an adjustment unit 304, and a second obtaining unit 305.

The first obtaining unit 301 is configured to obtain a to-be-processed face image.

The to-be-processed face image may include one or more faces, and may further include other objects. The face included in the face image may be a front face, or a side face at any angle.

The manner in which the first obtaining unit 301 obtains the face image may be as follows: during photographing, the face image is acquired by using a photographing camera, or a prestored face image is obtained from a local storage space, or the face image is obtained from an image database on a server. Certainly, the face image may alternatively be obtained in another manner, and the specific obtaining manner is not limited herein.

The receiving unit 302 is configured to: receive an operation instruction for deforming a target face portion of a face in the face image, and determine an operation type of deformation according to the operation instruction.

The receiving unit 302 may detect in real time or at intervals of a preset time whether the operation instruction is received. The operation instruction is used for instructing to perform a deformation operation on the target face portion of the face in the face image. The target face portion is a to-be-deformed face portion. The face portion may include eyes, eyebrows, a nose, a mouth, a face, and the like. A plurality of operation types of the deformation corresponding to each face region may be included. For example, the operation type of the deformation corresponding to the face portion may include adjusting an angle, an eyebrow distance, and a position of the eyebrows, adjusting a size, a width, a thickness, and a position of the mouth, adjusting a size, a wing, a bridge, a tip, and a position of the nose, adjusting a size, an eye height, an eye distance, an inclination, an eye brightening degree, and eye bag removing of the eyes, and adjusting an overall contour, cheeks, a chin, and a forehead of the face. When receiving the operation instruction, the receiving unit 302 may determine the operation type of the deformation according to the operation instruction. When the operation instruction is not received, the subsequent operations such as determining the operation type of the deformation according to the operation instruction may not be performed.

Figure 14:
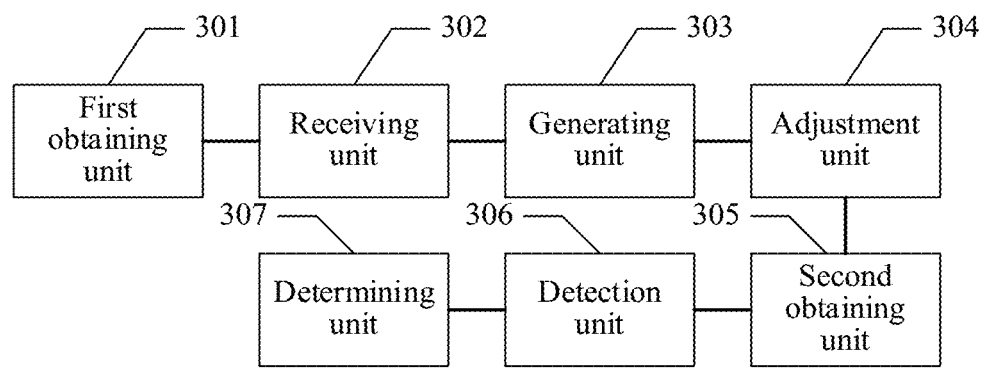
FIG. 14 is another schematic structural diagram of a face image processing apparatus according to an embodiment of this application.

In some implementations, as shown in FIG. 14, the face image processing apparatus may further include:

a detection unit 306, configured to perform feature point detection on the face in the face image, to obtain feature points of face portions; and a determining unit 307, configured to determine a to-be-deformed face portion in the face image according to the feature points, to obtain a target face portion.

After the first obtaining unit 301 obtains the to-be-processed face image, the detection unit 306 may perform the feature point detection on the face in the face image by using a face detection and registration technology. For example, the detection unit 306 may detect the face portions such as the eyes, the nose, the eyebrows, the mouth, and the face in the face image, to obtain feature points of the face portions. The feature points may be coordinate points of key points of the face portions. In this case, the determining unit 307 may determine a to-be-deformed face portion in the face image according to the feature points, to obtain a target face portion.

In some implementations, the determining unit 307 may be specifically configured to: determine, according to the feature points, a region in which the face portions in the face image are located; obtain a mapping relationship between an instruction identifier and a region identifier in response to receiving a selection instruction; determine, according to the mapping relationship, a region identifier corresponding to the instruction identifier of the selection instruction, to obtain a target region identifier; and determine a to-be-deformed face portion in the face image according to the target region identifier, to obtain the target face portion.

The receiving unit 302 is specifically configured to: receive a deformation request, and generate a deformation operation interface according to the deformation request, the deformation operation interface including a portion selection interface and a type setting interface; receive, through the portion selection interface, the operation instruction for deforming the target face portion of the face in the face image; and select the operation type of the deformation through the type setting interface according to the operation instruction.

Specifically, the receiving unit 302 may detect whether the deformation request is received. The deformation request is used for triggering a deformation operation on the target face portion of the face in the face image. When the deformation request is received, the deformation operation interface may be generated according to the deformation request. A selection may be made on a to-be-deformed target face portion, an operation type, and the adjustment parameter in the deformation operation interface. The deformation operation interface includes the portion selection interface and the type setting interface. The portion selection interface may be used for receiving the operation instruction, and the type setting interface may be used for selecting the operation type, and the like. Forms of the portion selection interface and the type setting interface may be flexibly set according to actual requirements. For example, a form such as an input text box, a selection button, or a selection list may be used. In this case, the receiving unit 302 may receive, through the portion selection interface, the operation instruction for deforming the target face portion of the face in the face image by the user, and select the operation type, and the like of the deformation through the type setting interface according to the operation instruction.

The generating unit 303 is configured to: determine deformation parameters of the deformation according to the operation type, and generate an adjuster according to the deformation parameters.

The deformation parameters may include: a deformation center, a deformation radius, a deformation type, a deformation intensity, and the like. The adjuster may correspond to one or more deformation units, and each deformation unit is provided with the deformation parameters. When dynamic adjustment is performed on the target face portion by using the adjuster, the adjuster may be triggered to invoke one or more deformation units, and the dynamic adjustment is performed on the target face portion according to deformation parameters of each invoked deformation unit. The adjuster may include a visible or invisible adjuster. The visible adjuster may be displayed in the display interface, and may include a slider form, an arrow form, or the like. The visible adjuster may be normally displayed in the display interface, or may be displayed in the display interface in a form of a hidden button, and the adjuster may be displayed by clicking the hidden button. The invisible adjuster may be not displayed in the display interface. For example, an adjustment amplitude of the adjustor may be controlled by sliding the screen left or right, or an adjustment amplitude of the adjustor may be controlled by sliding the screen up or down, thereby greatly saving the display space of the display interface.

Figure 13:
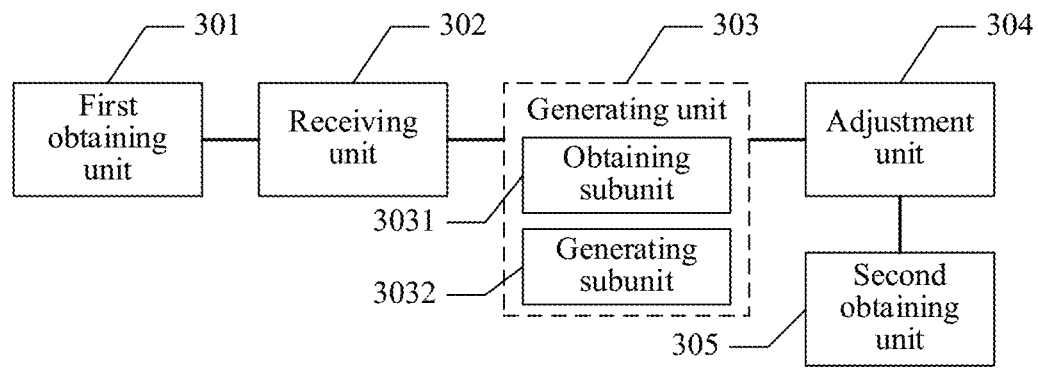
FIG. 13 is another schematic structural diagram of a face image processing apparatus according to an embodiment of this application.

In some implementations, as shown in FIG. 13, the generating unit 303 may include:

an obtaining subunit 3031, configured to: obtain a deformation unit set corresponding to the operation type, and determine deformation parameters corresponding to each deformation unit in the deformation unit set; and a generating subunit 3032, configured to generate the adjuster according to the deformation parameters.

In some implementations, the face image processing apparatus may further include: an establishment unit, configured to: set corresponding deformation unit sets for the operation types respectively, and establish a one-to-one correspondence between each operation type and the respective corresponding deformation unit set.

The obtaining subunit 3031 is specifically configured to: obtain a correspondence between the operation type and the deformation unit set, and determine, based on the correspondence, the deformation unit set corresponding to the operation type; and obtain a deformation center, a deformation radius, a deformation type, and a deformation intensity corresponding to each deformation unit in the deformation unit set.

The establishment unit may preset the deformation unit set that corresponds to each deformation and that corresponds to each operation type. The deformation unit set may include one or more deformation units. For example, an operation type for adjusting the eyebrow distance of the eyebrows may correspond to n1 deformation units, an operation type for adjusting the mouth size may correspond to n2 deformation units, and an operation type for adjusting the nose position may correspond to n3 deformation units. Values of n1, n2, and n3 may be flexibly set according to actual requirements. After setting the corresponding deformation unit sets for the operation types respectively, the establishment unit may establish the one-to-one correspondence between each operation type and the respective corresponding deformation unit set, for example, establish a correspondence between identifiers of the operation types and set identifiers of the respective corresponding deformation unit sets, and store the correspondence in the terminal or the server.

A shape, a size, a position, and the like of the deformation unit may be flexibly set according to actual requirements. For example, each deformation unit in one deformation unit set may be circular. Positions of the deformation units may be different. Sizes of some of the deformation units in one deformation unit set may be the same, while sizes of the other deformation units may be different. For example, as shown in FIG. 4, each circle in FIG. 4 represents each corresponding deformation unit.

Deformation parameters may be further set for each deformation unit. The deformation parameters may include a deformation center, a deformation radius, a deformation type, a deformation intensity, and the like. The deformation center is a center of the deformation unit, the deformation radius is a radius of the deformation unit, the deformation type may include: zooming in, zooming out, or pushing, and the deformation intensity may include: a zoom-in force, a zoom-out force, or a pushing force. The deformation parameters of the deformation unit may be used for performing a corresponding deformation operation on the face portion in the deformation unit according to the deformation parameters. A mapping relationship between the deformation parameters of the deformation units and the respective corresponding deformation unit may be established, and the mapping relationship between the deformation parameters and the deformation unit may be stored.

After determining the operation type, the obtaining subunit 3031 may obtain a deformation unit set corresponding to the operation type, and determine deformation parameters corresponding to each deformation unit in the deformation unit set. For example, the obtaining subunit 3031 may obtain the one-to-one correspondence between each operation type and the respective corresponding deformation unit set locally or from the server, and determine, based on the correspondence, the deformation unit set corresponding to the operation type. For example, the correspondence between an identifier of each operation type and a set identifier of the respective corresponding deformation unit set may be obtained, and the identifier of the operation type is obtained. Then, the set identifier corresponding to the identifier of the operation type is determined according to the correspondence, and the deformation unit set corresponding to the set identifier is determined, so that the obtained deformation unit set is the deformation unit set corresponding to the operation type.

After determining the deformation unit set corresponding to the operation type, the obtaining subunit 3031 may obtain the deformation parameters corresponding to each deformation unit in the deformation unit set. Because the deformation parameters for each deformation unit are preset, and the mapping relationship between the deformation parameters and the deformation unit is stored, the face image processing apparatus may obtain the mapping relationship between the deformation parameters and the deformation unit, and obtain, according to the mapping relationship between the deformation parameters and the deformation unit, the deformation parameters corresponding to each deformation unit in the deformation unit set. The deformation parameters of each deformation unit may include the deformation center, the deformation radius, the deformation type, the deformation intensity, and the like. After the deformation parameters are obtained, the generating subunit 3032 may generate an adjuster according to the deformation parameters.

The adjustment unit 304 is configured to: obtain an adjustment amplitude by which the adjuster performs dynamic adjustment on the target face portion, and display a change effect of the target face portion based on the dynamic adjustment in a display interface.

After the adjuster is generated, the dynamic adjustment may be performed on the target face portion by using the adjuster. For example, the eyes may be zoomed in by a first amplitude, then be zoomed in by a second amplitude, and then be zoomed out by a third amplitude by using the adjuster. In this case, the adjustment unit 304 may obtain the adjustment amplitude by which the adjuster performs dynamic adjustment on the target face portion, for example, may obtain a first adjustment amplitude by which the dynamic adjustment is performed on a cheek portion by sliding the screen left, and obtain a second adjustment amplitude e by which the dynamic adjustment is performed on the cheek portion by sliding the screen right. The adjustment amplitude may determine a deformation degree. It may be that a larger adjustment amplitude indicates a larger deformation degree, and a smaller adjustment amplitude indicates a smaller deformation degree. To help the user to observe the effect of dynamic adjustment in real time, in the process of performing dynamic adjustment on the target face portion, the change effect of the target face portion based on the dynamic adjustment may be displayed in the display interface, for the user's reference to further perform the dynamic adjustment, so that the effect required by the user can be obtained in a short time, and misoperations can be reduced.

The second obtaining unit 305 is configured to: determine an adjustment parameter according to the adjustment amplitude, and obtain the deformed face image according to the adjustment parameter.

In some implementations, the second obtaining unit 305 may include: a determining subunit, configured to: obtain a mapping relationship between adjustment amplitudes and adjustment parameters; and determine, according to the mapping relationship, the adjustment parameter corresponding to the adjustment amplitude.

Figure 15:
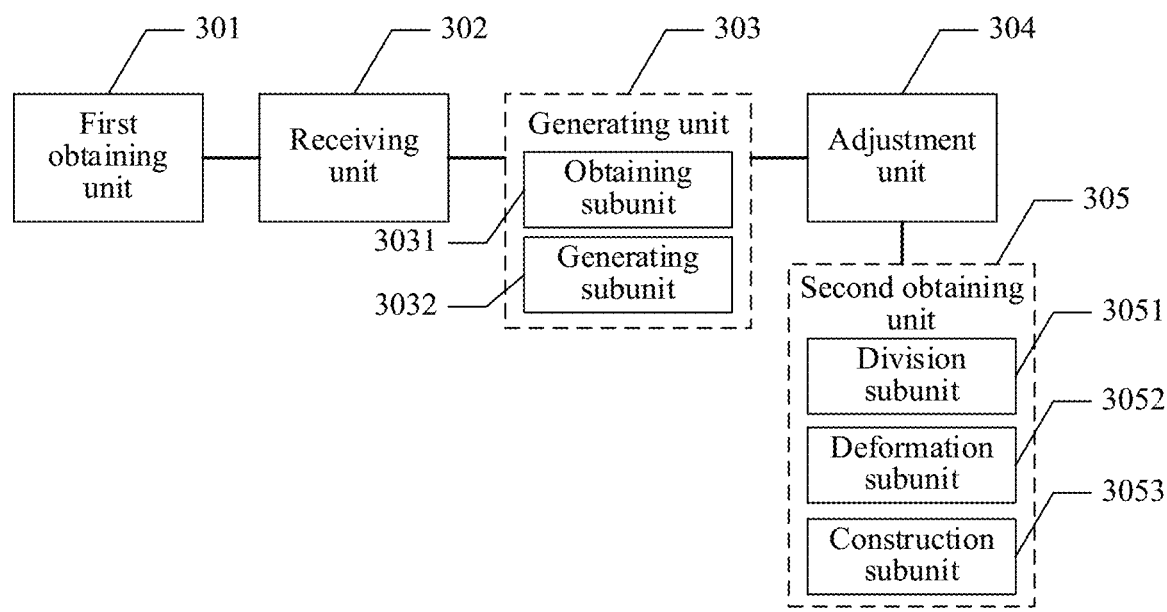
FIG. 15 is another schematic structural diagram of a face image processing apparatus according to an embodiment of this application.

In some implementations, as shown in FIG. 15, the second obtaining unit 305 may include:

a division subunit 3051, configured to: perform grid division on the face image, and determine a grid region in which the target face portion is located, to obtain a target grid region;

a deformation subunit 3052, configured to perform a deformation operation on the target grid region included in each deformation unit according to the adjustment parameter, to obtain a deformed grid region; and a construction subunit 3053, configured to: construct a deformed face portion according to the deformed grid region, and obtain the deformed face image according to the deformed face portion.

First, the division subunit 3051 may perform the grid division on the face image according to a preset algorithm, to obtain a plurality of grid regions, for example, as shown in FIG. 5*a*. The preset algorithm may be flexibly set according to an actual requirement. For example, the grid division may be performed according to a size of the face image. For example, the face image may be divided into 50*66 rectangular grids, or the face image may be divided into 60*80 rectangular grids. Alternatively, the grid division may be performed according to a size of the face portion in the face image. Then, the grid regions in which the to-be-deformed target face portion is distributed may be determined according to the feature points of the face portions obtained by performing the feature point detection on the face portion in the face image, to obtain the target grid region. In addition, the deformation subunit 3052 determines the target grid region that is included in each deformation unit in the deformation unit set and that corresponds to the to-be-deformed target face portion, and performs the deformation operation on the target grid region included in each deformation unit according to the adjustment parameter, to obtain a deformed grid region. Finally, the construction subunit 3053 may construct a deformed face portion according to the deformed grid region, and obtain the deformed face image according to the deformed face portion, for example, as shown in FIG. 5*b*.

In some implementations, the deformation subunit 3052 includes: a calculation module, configured to separately calculate an adjustment position of the target grid region included in each deformation unit according to the adjustment parameter; and an adjustment module, configured to adjust the target grid region according to the adjustment position, to obtain the deformed grid region.

In some implementations, the calculation module is specifically configured to: determine, according to the adjustment parameter, the deformation parameters corresponding to each deformation unit, and extract the deformation center, the deformation radius, the deformation type, and the deformation intensity from the deformation parameters corresponding to each deformation unit; determine a deformation region of each deformation unit according to the deformation center and the deformation radius, and determine the target grid region included in each deformation unit according to the deformation region; and separately calculate the adjustment position of the target grid region included in each deformation unit according to the deformation type and the deformation intensity.

The construction subunit 3053 is specifically configured to: perform interpolation processing on pixels in the deformed grid region, to obtain pixel values corresponding to the deformed grid region; and construct a deformed face portion according to the deformed grid region, and perform pixel rendering on the deformed face portion according to the pixel values, to obtain the deformed face image.

After the deformed grid region is determined, moving rendering of pixel points of the face image may be performed. For example, the construction subunit 3053 may use nearest neighbor interpolation, bilinear interpolation, pixel region relationship resampling, bicubic interpolation, and other interpolation methods to perform the interpolation processing on the pixels in the deformed grid region, to obtain the pixel values corresponding to the deformed grid region. Then, the construction subunit 3053 may construct the deformed face portion according to the deformed grid region, and perform the pixel rendering on the deformed face portion according to the pixel values, to obtain the deformed face image.

It can be learned from the above that, in this embodiment of this application, the first obtaining unit 301 may obtain the to-be-processed face image, and the receiving unit 302 receives the operation instruction for deforming the target face portion of the face in the face image, and determines the operation type of the deformation according to the operation instruction. For example, the receiving unit 302 may perform the deformation operation on the mouth width, the eye size, or the face size. Then, the generating unit 303 determines the deformation parameters of the deformation according to the operation type, and generates the adjuster according to the deformation parameters. In this case, the adjustment unit 304 may obtain the adjustment amplitude by which the adjuster performs the dynamic adjustment on the target face portion, and display the change effect of the target face portion based on the dynamic adjustment in the display interface, for the user's reference to perform the dynamic adjustment. Finally, the second obtaining unit 305 may determine the adjustment parameter according to the adjustment amplitude, and obtain the deformed face image according to the adjustment parameter. According to the solutions, a to-be-deformed target face portion may be determined according to division of the face portions, the adjuster is generated according to the deformation parameters to perform dynamic adjustment on the target face portion, and the change effect of the target face portion based on the dynamic adjustment is displayed for the user's reference, so that the deformed face image can be obtained without manually performing a blind pushing operation by the user in the face region, thereby improving the convenience and accuracy of processing the face image, improving the processing effect of the face image, and saving the processing time and the power.

Figure 16:
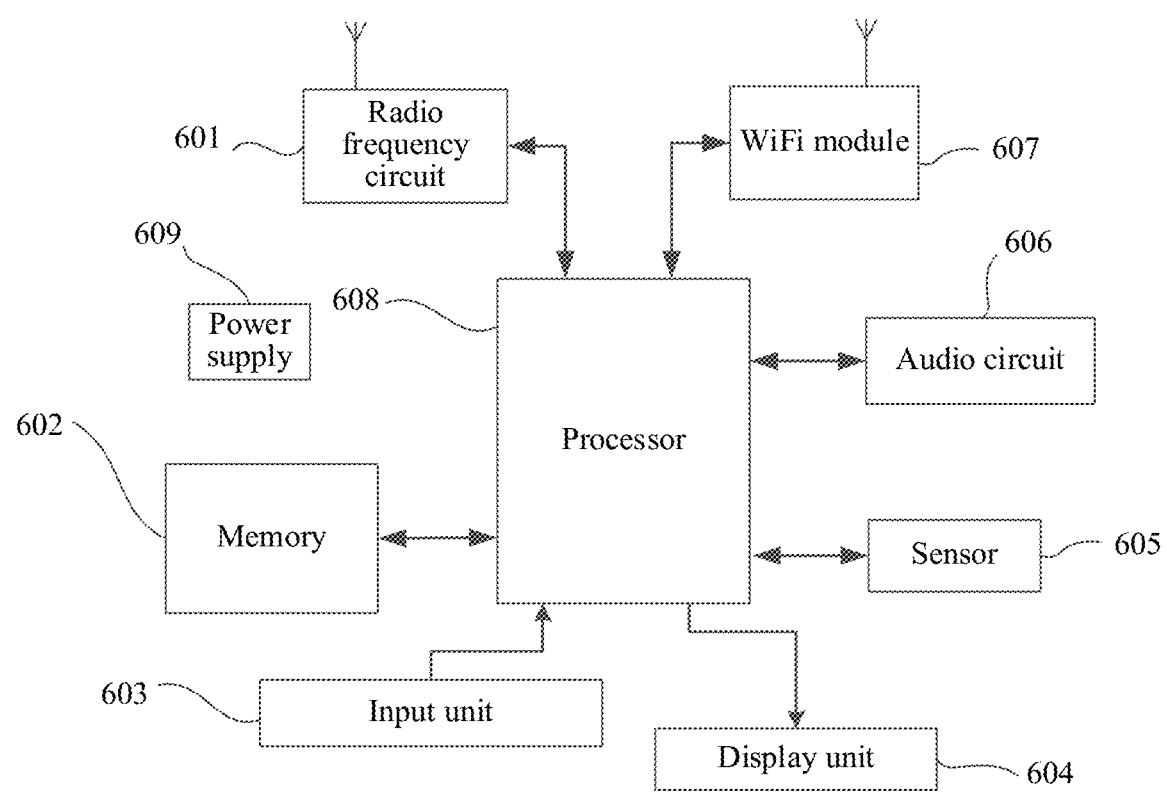
FIG. 16 is a schematic structural diagram of a terminal according to an embodiment of this application.

Correspondingly, an embodiment of this application further provides a terminal. As shown in FIG. 16, the terminal may include components such as a radio frequency (RF) circuit 601, a memory 602 including one or more computer-readable storage media, an input unit 603, a display unit 604, a sensor 605, an audio circuit 606, a Wireless Fidelity (Wi-Fi) module 607, a processor 608 including one or more processing cores, and a power supply 609. A terminal structure shown in FIG. 16 does not constitute a limitation to the terminal, and the terminal may include more or fewer components than those shown in the figure, or some components may be combined, or a different component deployment may be used.

The RF circuit 601 may be configured to receive and transmit information, or receive and transmit a signal in a conversation process. Specifically, after receiving downlink information of a base station, the RF circuit delivers the downlink information to one or more processors 608 for processing, and transmits related uplink data to the base station. Generally, the RF circuit 601 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 601 may also communicate with a network and another device through wireless communications. The wireless communications may use any communications standard or protocol, which includes, but is not limited to, Global system for mobile communications (GSM), general packet radio service (GPRS), Code Division Multiple Access (CDMA), Wideband Code Division Multiple Access (WCDMA), Long Term Evolution (LTE), email, short messaging service (SMS), and the like.

The memory 602 may be configured to store a software program and a module, and the processor 608 runs the software program and the module that are stored in the memory 602, to implement various functional applications and data processing. The memory 602 may mainly include a program storage area and a data storage area. The program storage area may store an operating system, an application program required by at least one function (such as a sound playback function and an image display function), and the like. The data storage area may store data (such as audio data and an address book) created according to use of the terminal, and the like. In addition, the memory 602 may include a high speed random access memory, and may also include a non-volatile memory, such as at least one magnetic disk storage device, a flash memory, or another volatile solid storage device. Correspondingly, the memory 602 may further include a memory controller, to provide access of the processor 608 and the input unit 603 to the memory 602.

The input unit 603 may be configured to receive input digit or character information, and generate a keyboard, mouse, joystick, optical, or track ball signal input related to a user setting and function control. Specifically, in a specific embodiment, the input unit 603 may include a touch-sensitive surface and another input device. The touch-sensitive surface, also be referred to as a touchscreen or a touch panel, may collect a touch operation of a user on or near the touch-sensitive surface (such as the step of a user on or near the touch-sensitive surface by using any suitable object or accessory, such as a finger or a stylus), and drive a corresponding connection apparatus according to a preset program. Optionally, the touch-sensitive surface may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and transmits the touch point coordinates to the processor 608. Moreover, the touch controller can receive and execute a command transmitted from the processor 608. In addition, the touch-sensitive surface may be implemented in a plurality of types, such as a resistive type, a capacitive type, an infrared type, and a surface acoustic wave type. In addition to the touch-sensitive surface, the input unit 603 may further include the another input device. Specifically, the another input device may include, but is not limited to, one or more of a physical keyboard, a functional key (such as a volume control key or a switch key), a track ball, a mouse, a joystick, and the like.

The display unit 604 may be configured to display information input by the user or information provided for the user, and various graphical user interfaces of the terminal. The graphical user interfaces may include a graph, a text, an icon, a video, or any combination thereof. The display unit 604 may include a display panel. Optionally, the display panel may be configured by using a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 608, to determine the type of the touch event. Then, the processor 608 provides a corresponding visual output on the display panel according to the type of the touch event. Although, in FIG. 16, the touch-sensitive surface and the display panel are used as two separate parts to implement input and output functions. However, in some embodiments, the touch-sensitive surface and the display panel may be integrated to implement the input and output functions.

The terminal may further include at least one sensor 605, for example, an optical sensor, a motion sensor, and another sensor. Specifically, the optical sensor may include an ambient light sensor and a proximity sensor. The ambient light sensor may adjust luminance of the display panel according to brightness of the ambient light. The proximity sensor may switch off the display panel and/or backlight when the terminal is moved to ears. As one type of the motion sensor, a gravity acceleration sensor may detect magnitude of acceleration in each direction (which generally is triaxial), may detect a value and a direction of the gravity when being static, and may be configured to an application that recognizes a terminal attitude (such as a handover between horizontal and longitudinal screens, a related game, and magnetometer attitude calibration), a function related to vibration identification (such as a pedometer and a knock), and the like. The other sensor, such as a gyroscope, a barometer, a hygrometer, a thermometer, and an infrared sensor, which can be configured in the terminal is not described herein again.

The audio circuit 606, a speaker, and a microphone may provide audio interfaces between the user and the terminal. The audio circuit 606 may convert received audio data into an electric signal and transmit the electric signal to the speaker. The speaker converts the electric signal into a sound signal for output. On the other hand, the microphone converts a collected sound signal into an electric signal. The audio circuit 606 receives the electric signal and converts the electric signal into audio data, and outputs the audio data to the processor 608 for processing. Then, the processor 608 transmits the audio data to, for example, another terminal by using the RF circuit 601, or outputs the audio data to the memory 602 for further processing. The audio circuit 606 may further include an earplug jack, to provide communications between a peripheral earphone and the terminal.

Wi-Fi belongs to a short distance wireless transmission technology. The terminal may help, by using a Wi-Fi module 607, the user to receive and transmit the email, browse a web page, an access stream medium, and the like, which provides wireless broadband Internet access for the user. Although FIG. 16 shows the Wi-Fi module 607, it may be understood that the Wi-Fi module is not a necessary component of the terminal, and when required, the Wi-Fi module may be omitted as long as the scope of the essence of the present disclosure is not changed.

The processor 608 is a control center of the terminal, and connects to various parts of the terminal by using various interfaces and lines. By running or executing the software program and/or module stored in the memory 602, and invoking data stored in the memory 602, the processor performs various functions and data processing of the terminal, thereby performing overall monitoring on the terminal. Optionally, the processor 608 may include one or more processing cores. The processor 608 may integrate an application processor and a modem processor. The application processor mainly processes an operating system, a user interface, an application and the like. The modem processor mainly processes wireless communications. It may be understood that, the foregoing modem may either not be integrated into the processor 608.

The terminal further includes the power supply 609 (such as a battery) for supplying power to the components. The power supply may be logically connected to the processor 608 by using a power management system, thereby implementing functions such as charging management, discharging management, and power consumption management by using the power management system. The power supply 609 may further include one or more of a direct current or alternating current power supply, a re-charging system, a power failure detection circuit, a power supply converter or inverter, a power supply state indicator, and any other component.

Although not shown in the figure, the terminal may further include a camera, a Bluetooth module, and the like. Details are not described herein again. Specifically, in this embodiment, the processor 608 in the terminal may load executable files corresponding to processes of one or more application programs to the memory 602 according to the following instructions, and the processor 608 runs the application programs stored in the memory 602 to implement various functions:

obtaining a to-be-processed face image; receiving an operation instruction for deforming a target face portion of a face in the face image, and determining an operation type of deformation according to the operation instruction; determining deformation parameters of the deformation according to the operation type, and generating an adjuster according to the deformation parameters; obtaining an adjustment amplitude by which the adjuster performs dynamic adjustment on the target face portion, and displaying a change effect of the target face portion based on the dynamic adjustment in a display interface; and determining an adjustment parameter according to the adjustment amplitude, and obtaining the deformed face image according to the adjustment parameter.

The step of determining deformation parameters of the deformation according to the operation type, and generating an adjuster according to the deformation parameters may include: obtaining a deformation unit set corresponding to the operation type, and determining deformation parameters corresponding to each deformation unit in the deformation unit set; and generating the adjuster according to the deformation parameters.

The step of receiving an operation instruction for deforming a target face portion of a face in the face image, and determining an operation type of deformation according to the operation instruction may include: receiving a deformation request, and generating a deformation operation interface according to the deformation request, the deformation operation interface including a portion selection interface and a type setting interface; receiving, through the portion selection interface, the operation instruction for deforming the target face portion of the face in the face image; and selecting the operation type of the deformation through the type setting interface according to the operation instruction.

The step of obtaining the deformed face image according to the adjustment parameter may include: performing grid division on the face image, and determining a grid region in which the target face portion is located, to obtain a target grid region; performing, a deformation operation on the target grid region included in each deformation unit according to the adjustment parameter, to obtain a deformed grid region; and constructing a deformed face portion according to the deformed grid region, and obtaining the deformed face image according to the deformed face portion.

In the foregoing embodiments, the descriptions of the embodiments have respective focuses. For a part that is not described in detail in an embodiment, refer to the foregoing detailed description of the face image processing method. Details are not described herein again.

It can be learned from the above that, in this embodiment of this application, the to-be-processed face image may be obtained, and the operation instruction for deforming the target face portion of the face in the face image may be received. The operation type of the deformation is determined according to the operation instruction. For example, the deformation operation may be performed on the mouth width, the eye size, or the face size. Then, the deformation parameters of the deformation are determined according to the operation type, and the adjuster is generated according to the deformation parameters. In this case, the adjustment amplitude by which the adjuster performs the dynamic adjustment on the target face portion may be obtained, and the change effect of the target face portion based on the dynamic adjustment is displayed in the display interface, for the user's reference to perform the dynamic adjustment. Finally, the adjustment parameter may be determined according to the adjustment amplitude, and the deformed face image is obtained according to the adjustment parameter. According to the solutions, a to-be-deformed target face portion may be determined according to division of the face portions, the adjuster is generated according to the deformation parameters to perform dynamic adjustment on the target face portion, and the change effect of the target face portion based on the dynamic adjustment is displayed for the user's reference, so that the deformed face image can be obtained without manually performing a blind pushing operation by the user in the face region, thereby improving the convenience of processing the face image, and improving the processing effect of the face image.

All or some steps of the methods of the foregoing embodiments may be implemented through instructions, or may be implemented through instructions controlling relevant hardware, and the instructions may be stored in a non-transitory computer-readable storage medium, and may be loaded and executed by a processor.

Accordingly, an embodiment of this application provides a non-transitory computer-readable storage medium, storing a plurality of instructions. The instructions can be loaded by the processor, to perform the steps in any face image processing method according to the embodiments of this application. For example, the instructions may perform the following steps:

obtaining a to-be-processed face image; receiving an operation instruction for deforming a target face portion of a face in the face image, and determining an operation type of deformation according to the operation instruction; determining deformation parameters of the deformation according to the operation type, and generating an adjuster according to the deformation parameters; obtaining an adjustment amplitude by which the adjuster performs dynamic adjustment on the target face portion, and displaying a change effect of the target face portion based on the dynamic adjustment in a display interface; and determining an adjustment parameter according to the adjustment amplitude, and obtaining the deformed face image according to the adjustment parameter.

The step of determining deformation parameters of the deformation according to the operation type, and generating an adjuster according to the deformation parameters may include: obtaining a deformation unit set corresponding to the operation type, and determining deformation parameters corresponding to each deformation unit in the deformation unit set; and generating the adjuster according to the deformation parameters.

The step of receiving an operation instruction for deforming a target face portion of a face in the face image, and determining an operation type of deformation according to the operation instruction may include: receiving a deformation request, and generating a deformation operation interface according to the deformation request, the deformation operation interface including a portion selection interface and a type setting interface; receiving, through the portion selection interface, the operation instruction for deforming the target face portion of the face in the face image; and selecting the operation type of the deformation through the type setting interface according to the operation instruction.

The step of obtaining the deformed face image according to the adjustment parameter may include: performing grid division on the face image, and determining a grid region in which the target face portion is located, to obtain a target grid region; performing a deformation operation on the target grid region included in each deformation unit according to the adjustment parameter, to obtain a deformed grid region; and constructing a deformed face portion according to the deformed grid region, and obtaining the deformed face image according to the deformed face portion.

For specific implementations of the foregoing operations, refer to the foregoing embodiments. Details are not described herein again.

The non-transitory computer-readable storage medium may include: a read-only memory (ROM), a random access memory (RAM), a magnetic disk, an optical disc, or the like.

Because the instructions stored in the non-transitory computer-readable storage medium may perform the steps of any face image processing method provided in the embodiments of this application, the instructions can implement beneficial effects that may be implemented by any face image processing method in the embodiments of this application. For details, refer to the foregoing embodiments. Details are not described herein again.

The face image processing method and apparatus, and the non-transitory computer-readable storage medium provided in the embodiments of this application are described in detail above. The principle and implementations of this application are described herein by using specific examples in this specification. The descriptions of the foregoing embodiments are merely intended to help understand the method and the core idea of this application. In addition, a person skilled in the art may make modifications to the specific implementations and the application range according to the ideas of this application. In conclusion, the content of this specification shall not be construed as a limitation to this application.

What is claimed is:

1. A face image processing method, performed by a computing device having a processor and memory storing a plurality of computer programs to be executed by the processor, the method comprising:

obtaining a to-be-processed face image;

receiving an operation instruction for deforming a target face portion of a face in the face image;

determining an operation type of deformation according to the operation instruction and deformation parameters of the deformation according to the operation type;

generating an adjuster according to the deformation parameters;

obtaining an adjustment amplitude by which the adjuster performs dynamic adjustment on the target face portion; and dynamically displaying a change effect of the target face portion based on the dynamic adjustment in a display interface.

2. The face image processing method according to claim 1, wherein the operation of determining deformation parameters of the deformation according to the operation type, and generating an adjuster according to the deformation parameters comprises:

obtaining a deformation unit set corresponding to the operation type;

determining deformation parameters corresponding to each deformation unit in the deformation unit set; and generating the adjuster according to the deformation parameters.

3. The face image processing method according to claim 2, wherein before the operation of obtaining a deformation unit set corresponding to the operation type, the method further comprises:

defining corresponding deformation unit sets for operation types respectively, and establishing a one-to-one correspondence between each operation type and the respective corresponding deformation unit set; and the operation of obtaining a deformation unit set corresponding to the operation type, and determining deformation parameters corresponding to each deformation unit in the deformation unit set comprises:

obtaining a one-to-one correspondence corresponding to the operation type;

determining, based on the one-to-one correspondence, the deformation unit set corresponding to the operation type; and obtaining a deformation center, a deformation radius, a deformation type, and a deformation intensity corresponding to each deformation unit in the deformation unit set.

4. The face image processing method according to claim 1, wherein before the operation of receiving an operation instruction for deforming a target face portion of a face in the face image, the method further comprises:

performing feature point detection on the face in the face image, to obtain feature points of face portions; and determining a to-be-deformed face portion in the face image according to the feature points as the target face portion.

5. The face image processing method according to claim 4, wherein the operation of determining a to-be-deformed face portion in the face image according to the feature points as the target face portion comprises:

determining, according to the feature points, a region in which the face portions in the face image are located;

obtaining a mapping relationship between an instruction identifier and a region identifier in response to receiving a selection instruction;

determining, according to the mapping relationship, a region identifier corresponding to the instruction identifier of the selection instruction, to obtain a target region identifier; and determining the to-be-deformed face portion in the face image according to the target region identifier, to obtain the target face portion.

6. The face image processing method according to claim 1, wherein the operation of receiving an operation instruction for deforming a target face portion of a face in the face image comprises:

receiving a deformation request, and generating a deformation operation interface according to the deformation request, the deformation operation interface comprising a portion selection interface and a type setting interface;

receiving, through the portion selection interface, the operation instruction for deforming the target face portion of the face in the face image; and selecting the operation type of the deformation through the type setting interface according to the operation instruction.

7. The face image processing method according to claim 1, further comprising:

obtaining a mapping relationship between adjustment amplitudes and adjustment parameters;

determining, according to the mapping relationship, an adjustment parameter corresponding to the adjustment amplitude; and obtaining a deformed face image according to the adjustment parameter.

8. The face image processing method according to claim 7, wherein the operation of obtaining a deformed face image according to the adjustment parameter comprises:

performing grid division on the face image, and determining a grid region in which the target face portion is located, to obtain a target grid region;

performing a deformation operation on the target grid region comprised in each deformation unit according to the adjustment parameter, to obtain a deformed grid region; and constructing a deformed face portion according to the deformed grid region, and obtaining the deformed face image according to the deformed face portion.

9. The face image processing method according to claim 8, wherein the operation of performing a deformation operation on the target grid region comprised in each deformation unit according to the adjustment parameter, to obtain a deformed grid region comprises:

separately calculating, according to the adjustment parameter, an adjustment position of the target grid region comprised in each deformation unit; and adjusting the target grid region according to the adjustment position, to obtain the deformed grid region.

10. The face image processing method according to claim 9, wherein the operation of separately calculating, according to the adjustment parameter, an adjustment position of the target grid region comprised in each deformation unit comprises:

determining, according to the adjustment parameter, the deformation parameters corresponding to each deformation unit, and extracting the deformation center, the deformation radius, the deformation type, and the deformation intensity from the deformation parameters corresponding to each deformation unit;

determining a deformation region of each deformation unit according to the deformation center and the deformation radius, and determining, according to the deformation region, the target grid region comprised in each deformation unit; and separately calculating, according to the deformation type and the deformation intensity, the adjustment position of the target grid region comprised in each deformation unit.

11. The face image processing method according to claim 8, wherein the operation of constructing a deformed face portion according to the deformed grid region, and obtaining the deformed face image according to the deformed face portion comprises:

performing interpolation processing on pixels in the deformed grid region, to obtain pixel values corresponding to the deformed grid region; and constructing the deformed face portion according to the deformed grid region, and performing pixel rendering on the deformed face portion according to the pixel values, to obtain the deformed face image.

12. A computing device, comprising a processor and a memory, the memory storing a plurality of computer programs, and the computer programs, when executed by the processor, causing the computing device to perform a plurality of operations including:

obtaining a to-be-processed face image;

receiving an operation instruction for deforming a target face portion of a face in the face image;

determining an operation type of deformation according to the operation instruction and deformation parameters of the deformation according to the operation type;

generating an adjuster according to the deformation parameters;

obtaining an adjustment amplitude by which the adjuster performs dynamic adjustment on the target face portion; and dynamically displaying a change effect of the target face portion based on the dynamic adjustment in a display interface.

13. The computing device according to claim 12, wherein the operation of determining deformation parameters of the deformation according to the operation type, and generating an adjuster according to the deformation parameters comprises:

obtaining a deformation unit set corresponding to the operation type;

determining deformation parameters corresponding to each deformation unit in the deformation unit set; and generating the adjuster according to the deformation parameters.

14. The computing device according to claim 13, wherein the plurality of operations further comprise:

before obtaining the deformation unit set corresponding to the operation type:

defining corresponding deformation unit sets for operation types respectively, and establishing a one-to-one correspondence between each operation type and the respective corresponding deformation unit set; and wherein the operation of obtaining a deformation unit set corresponding to the operation type, and determining deformation parameters corresponding to each deformation unit in the deformation unit set comprises:

obtaining a one-to-one correspondence corresponding to the operation type;

determining, based on the one-to-one correspondence, the deformation unit set corresponding to the operation type; and obtaining a deformation center, a deformation radius, a deformation type, and a deformation intensity corresponding to each deformation unit in the deformation unit set.

15. The computing device according to claim 12, wherein the plurality of operations further comprise:

before receiving the operation instruction for deforming a target face portion of a face in the face image:

performing feature point detection on the face in the face image, to obtain feature points of face portions; and determining a to-be-deformed face portion in the face image according to the feature points as the target face portion.

16. The computing device according to claim 15, wherein the operation of determining a to-be-deformed face portion in the face image according to the feature points as the target face portion comprises:

determining, according to the feature points, a region in which the face portions in the face image are located;

obtaining a mapping relationship between an instruction identifier and a region identifier in response to receiving a selection instruction;

determining, according to the mapping relationship, a region identifier corresponding to the instruction identifier of the selection instruction, to obtain a target region identifier; and determining the to-be-deformed face portion in the face image according to the target region identifier, to obtain the target face portion.

17. The computing device according to claim 12, wherein the operation of receiving an operation instruction for deforming a target face portion of a face in the face image comprises:

receiving a deformation request, and generating a deformation operation interface according to the deformation request, the deformation operation interface comprising a portion selection interface and a type setting interface;

receiving, through the portion selection interface, the operation instruction for deforming the target face portion of the face in the face image; and selecting the operation type of the deformation through the type setting interface according to the operation instruction.

18. The computing device according to claim 12, wherein the plurality of operations further comprise:

obtaining a mapping relationship between adjustment amplitudes and adjustment parameters;

determining, according to the mapping relationship, an adjustment parameter corresponding to the adjustment amplitude; and obtaining a deformed face image according to the adjustment parameter.

19. The computing device according to claim 18, wherein the operation of obtaining a deformed face image according to the adjustment parameter comprises:

performing grid division on the face image, and determining a grid region in which the target face portion is located, to obtain a target grid region;

performing a deformation operation on the target grid region comprised in each deformation unit according to the adjustment parameter, to obtain a deformed grid region; and constructing a deformed face portion according to the deformed grid region, and obtaining the deformed face image according to the deformed face portion.

20. A non-transitory computer-readable storage medium, storing a plurality of computer programs, the computer programs, when executed by a processor of a computing device, causing the computing device to perform a plurality of operations including:

obtaining a to-be-processed face image;

receiving an operation instruction for deforming a target face portion of a face in the face image;

determining an operation type of deformation according to the operation instruction and deformation parameters of the deformation according to the operation type;

generating an adjuster according to the deformation parameters;

obtaining an adjustment amplitude by which the adjuster performs dynamic adjustment on the target face portion; and dynamically displaying a change effect of the target face portion based on the dynamic adjustment in a display interface.

* * * * *